United States Patent [19]
Yamada et al.

[11] Patent Number: 5,684,778
[45] Date of Patent: Nov. 4, 1997

[54] INITIALIZATION PROCESS FOR A PHASE CHANGE RECORDING MEDIUM WITH A ZERO LEVEL DROP IN FLASH LIGHT EMISSION

[75] Inventors: Noboru Yamada; Katsumi Kawahara, both of Osaka; Shigeaki Furukawa, Nara, all of Japan

[73] Assignee: Matsushita Electric Industrial Co., Ltd., Osaka, Japan

[21] Appl. No.: 533,147

[22] Filed: Sep. 25, 1995

[30] Foreign Application Priority Data

| Sep. 27, 1994 | [JP] | Japan | 6-231035 |
| Sep. 28, 1994 | [JP] | Japan | 6-232896 |
| Sep. 28, 1994 | [JP] | Japan | 6-233829 |
| Sep. 28, 1994 | [JP] | Japan | 6-233830 |
| Sep. 30, 1994 | [JP] | Japan | 6-236748 |

[51] Int. Cl.$^6$ ............... G11B 7/24; B41M 5/26
[52] U.S. Cl. ............ 369/100; 369/121; 369/116; 369/284; 430/270.13
[58] Field of Search ............... 369/100, 288, 369/283, 281, 284, 59, 116, 121; 430/270.13, 271, 272, 273–279, 290; 428/64, 65, 457, 913, 945

[56] References Cited

U.S. PATENT DOCUMENTS

| 4,917,751 | 4/1990 | Ohta et al. | 156/272.2 |
| 5,024,927 | 6/1991 | Yamada et al. | 430/495 |
| 5,206,114 | 4/1993 | Kobayashi | 430/270 |
| 5,254,382 | 10/1993 | Ueno et al. | 428/64 |
| 5,314,734 | 5/1994 | Nishida et al. | 428/64 |

FOREIGN PATENT DOCUMENTS

| 0 180 103 | 5/1986 | European Pat. Off. . |
| 0 234 588 | 9/1987 | European Pat. Off. . |
| 0 288 354 | 10/1988 | European Pat. Off. . |
| 0 419 295 | 3/1991 | European Pat. Off. . |
| 42 03 590 | 12/1992 | Germany . |
| 60-106031 | 6/1985 | Japan . |
| 62-250533 | 10/1987 | Japan . |
| 63-261552 | 10/1988 | Japan . |
| 63-261553 | 10/1988 | Japan . |
| 1-102754 | 4/1989 | Japan . |
| 2-210631 | 8/1990 | Japan . |
| 3-35424 | 2/1991 | Japan . |
| 5-151623 | 6/1993 | Japan . |
| 2 004 404 | 3/1979 | United Kingdom . |
| 2 017 379 | 10/1979 | United Kingdom . |

OTHER PUBLICATIONS

A–3–0–35424, *Patent Abstracts of Japan*, vol. 15, No. 172, Apr. 30, 1991.
A–2–0–29953, *Patent Abstracts of Japan*, vol. 14, No. 183, Apr. 12, 1990.

*Primary Examiner*—Georgia Y. Epps
*Assistant Examiner*—Kim-Kwok Chu
*Attorney, Agent, or Firm*—Merchant, Gould, Smith, Edell, Welter & Schmidt, P.A.

[57] ABSTRACT

The present invention relates to a production process and a production apparatus for the optical information recording media comprising a material thin film which exhibits a reversible change of the optical characteristics by the irradiation of an energy beam such as a laser beam on the substrate. By dropping the emission strength instantly to the virtual zero level after having the emission for a specified time in conducting the initial crystallization process, both a large irradiation power and a short irradiation time can be achieved to reduce the various thermal damages. The charging time can be shortened. In the production of optical information recording materials with single side structure, in particular, by applying an annealing process in combination with a formation process of the resin protection layer or a recording thin fil initialization process, the warp or distortion of media caused by the contraction of the ultraviolet ray curing resin layer or the recording thin film layer can be reduced or corrected to realize an optical information recording medium having excellent servo characteristics. Further, by having at least one of two media to be affixed with a transmissivity of an ultraviolet ray of 3% or more as a method to comprise an optical information recording medium with double sides structure not liable to have a warp or distortion, an ultraviolet ray curing resin can be used as an adhesive, resulting in simplifing the production process.

36 Claims, 17 Drawing Sheets

Fixing the inner periphery with a jig

Fixing the outer periphery with a jig

Fixing the inner periphery and the outerperiphery with jigs

Correcting the convex surface to be concave and fixing with a jig $$\text{Tilt} = \frac{r}{H} \text{ [radian]}$$

INITIALIZATION PROCESS FOR A PHASE CHANGE RECORDING MEDIUM WITH A ZERO LEVEL DROP IN FLASH LIGHT EMISSION

BACKGROUND OF THE INVENTION

1. Field of the Invention

The present invention relates to the production process and production apparatus for optical information recording media comprising a recording thin film layer on a substrate with phase transition between the crystal phase and the amorphous phase by laser beam irradiation.

2. Description of the Prior Art

As conventional phase transition optical information recording media, substrates of disk type, card type, sheet type or film type having a chalcogenide thin film including Te or Se as the main component such as Ge-Sb-Te and In-Se, or a semimetal thin film formed thereon as the information recording layer are known. In phase transition light recording, for example, instant irradiation of a laser beam focused on a light spot of submicron order size to the above mentioned recording thin film layer comprising a phase transition material raises the local temperature of the irradiated region to change the atomic distribution thereof. If the temperature of the irradiated region reaches the crystallization temperature or over, the minute region comes into the crystal state, and if the temperature of the irradiated region reaches the melting point or over, the minute region comes into the amorphous phase. If each of the amorphous phase and the crystal phase is determined to be the recorded state and the erased state (or unrecorded state) or vice versa, recording and erasure of information can be conducted reversibly. Since the optical characteristics of the crystal phase and the amorphous phase are different in such a recording thin film layer, the signal can be reproduced by detecting the difference of the characteristics by an optical means.

In addition to the method of using the phase transition between the amorphous phase and the crystal phase, another example of applying the phase transition of a substance to information recording is the method of using the phase transition between the high temperature phase and the low temperature phase in the crystal state. It is known that the procedure can be conducted similarly with the high temperature phase as the amorphous phase and the low temperature phase as the crystal phase.

In general, since recording is conducted from the crystal phase to the amorphous phase in the above mentioned optical information recording media using phase transition between the amorphous phase and the crystal phase as the premise, the phase of the recording thin film should be converted to the crystal phase in advance. This operation is called initialization.

As a method of initialization, serial processing methods using a laser beam, as disclosed in the official gazette of the Japanese Patent Application Laid Open No. 106031/1985, are practically used. That is, a light spot of from several tens to several hundreds μm is formed by means of a laser beam with the output far greater than that of a laser diode for recording and reproduction. By irradiating the light spot with a medium forwarding at a constant speed, many tracks can be crystallized in a single operation. This method has good points in the respect that since the medium is heated in a small area at a time, thermal load is small and the medium is unlikely to crack. But this method also has the disadvantage that initialization takes a long time.

On the other hand, a method of crystallizing the disk surface collectively by means of a flash of light is also used. For example, this method is advocated in the official gazette of the Japanese Patent Application Laid Open No. 62-250533, October 1987. The method of conducting initialization by forming a recording film having phase transition characteristics between the crystalline and the amorphous states (for example, a recording layer of $Te_{90}Ge_{10}$ having 70 nm thickness sandwiched by $SiO_2$ layers having 100 nm thickness) on an organic substrate (acrylic resin) is disclosed in the official gazette. The official gazette discloses that a xenon flash was used as the light source and a reflecting mirror was used. The exposure time was from 1 μs to 1 ms, and irradiation of 1 MW output was conducted for 500 μs (energy was 500 J) but there are no disclosure of examples of accurate emission waveform of the flash light, a method of controlling the emission waveform, and the structure of the power source at all. Further, all examples in the gazette are conducted with the flash light irradiation from the recording film side, and there is no disclosure of the flash exposure from the substrate side.

Another prior art, the official gazette, of the Japanese Patent Application Laid Open No. 63-261533, October 1988, discloses the possibility of initialization using a flash light during the process of forming an optical disk. The specification of the official gazette discloses the result of initialization experiments in three stages, namely, the stage in which a recording film (Sb-Se-Bi film with 120 nm thickness) is formed on the substrate (polycarbonate), the stage of forming the protection film (ultraviolet ray curing resin or $SiO_2$ film with 50 nm to 1 μm thickness), and the stage of affixing two disks with an adhesive. That is, minute unevenness tends to be formed on the substrate surface (the side on which a recording film is formed and opposite to the irradiation side) by thermal damage when irradiation is provided from the substrate side. Further, the specification also discloses a method of covering the inside perimeter portion and the outside perimeter portion of the disk with a mask at the time of irradiating the flash light to solve the problem. However, in this case, as a condition of flash light irradiation, only the emission time of the flash lamp for 0.5 ms to 2 ms is disclosed and any other condition such as examples of emission waveform variations or a method to control the emission waveform in the most suitable form is not described at all.

As a prior art concerning the control of irradiation waveform of a flash light, the official gazette of the Japanese Patent Application Laid Open No. 3-35424, February 1991 can be cited. The example 5 in the specification of the official gazette discloses that by having the emission with the relationship of the time from starting emission to the peak of the emission intensity Δt3 and the time from the peak of the emission intensity to terminating emission Δt4 to be Δt4≦Δt3, a crystallization with little thermal damage effect can be conducted. As a method of that, the circuit is described in FIG. 11 in the specification. However, the above mentioned circuit is a general one to provide discharge emission of the flash lamp and in this case the emission time (discharge duration) can be automatically determined by the time constant of the circuit. That is, in the circuit disclosed in this prior art, it is difficult to optionally set t3 and t4 independently. In this context, this is different from the present invention later described in detail in which discharge is mandatorily terminated instantly after a discharge in a specific time.

Further, the specification discloses that the changing speed of the emission power (rise time and fall time) can be optionally selected. However, no guidance concerning judgement standards, namely, whether a steep changing speed is preferable or moderate changing speed is preferable, is provided. Rather, it is disclosed in lines 1 to 2 in the left upper column of page 4 of the specification that the changing shape of the rising edge and the falling edge has no special meaning with reference to FIG. 3 thereof. In particular, although a special measure seems to be necessary in order to have a steep falling edge as illustrated in FIG. 3 (or FIG. 1 or FIG. 6) of the specification, any means to achieve it is not disclosed therein.

In general, the easiest way to obtain a steep falling edge as illustrated in the FIG. 3 in a common discharge circuit is to decrease the time constant of the circuit. In that case, however, the capacitance to store the energy should be reduced as well, generally resulting in reducing the emission energy accordingly. No prior references disclose a method to achieve both maintenance of a large emission energy and a steep falling edge, and the effect therefrom.

As disclosed in the cited references, a problem in the flash initialization methods is that the substrate is susceptible to suffer thermal damage (contraction, distortion, and warp) when a resin substrate is used. Thus several proposals have been advocated to solve the problem. However, in every method in the cited references, the absolute value of the discharge duration is determined automatically depending upon the time constant of the circuit, and emission waveform such as the emission time, rise time, fall time is not determined according to the recording medium easily and optionally.

Since generally the time constant of a discharge circuit is inversely proportional to the capacitance, enlargement of the emission energy and shortening the discharge time are contradicting elements. Therefore the irradiation power and the irradiation time can not be determined optionally as independent variables so far, which is inconvenient. In other words, it is not easy to provide the optimum condition to media having various characteristics, namely, various media having different crystallization temperatures or different crystallization speeds. Therefore such apparatus have not been used widely.

A most common structure of a phase transition recording medium having a substrate 40 on which a recording thin film layer 42 sandwiched by dielectric layers 41, 43, a reflecting layer 44 and a protection layer 45 are formed successively is illustrated in FIG. 10A. As a protection layer 45, an ultraviolet ray curing resin is often applied by a method such as spin coating by several tens of μm thickness followed by ultraviolet ray irradiation for curing. In general, the case of using only one side of a disk with the method is called the single side structure. On the other hand, the case having two single structure media affixed together with the film surface butted together as illustrated in FIG. 10B is called the double sides structure. In producing double sides structure media, a method of affixing two single side structure substrates having a protection layer of an ultraviolet ray curing resin layer formed thereon with the protection layers innerside by means of a hot melt adhesive is used. The affixing method needs at least four steps comprising (1) a step of applying an ultraviolet ray curing resin layer to each single side structure medium, (2) a step of forming the protection layer by irradiating an ultraviolet ray thereto, (3) a step of applying a liquid hot melt adhesive to the surface of each protection layer, and (4) a step of attaching media with the surfaces on which the adhesive is applied together followed by cooling to affix the planes to be bonded. Therefore the number of steps included is greater than that of the production process of a substrate with single side structure.

A method of forming a medium with double sides structure by affixing media with single side structure with an ultraviolet ray curing resin layer as the adhesion layer is disclosed in the official gazette of the Japanese Patent Application Laid Open No. 275057/1988. However, in the method disclosed therein an ultraviolet ray is irradiated to the disk surface from the horizontal direction so as to facilitate curing the resin, therefore the method is different from the method of the present invention which is commonly used to affix media by irradiating an ultraviolet ray to the disk surface from the vertical direction. The method used in the above mentioned conventional art is to irradiate an ultraviolet ray from the section of the media at which the resin layer is exposed. Therefore there are problems such as difficulty of improving irradiation efficiency and the need of a plurality of the ultraviolet ray irradiating light source.

The reason why an ultraviolet ray curing resin is not used as the adhesive in the production process of a substrate with double sides structure is as follows. That is, since phase transition type optical disks as well as magneto-optical disks have a metal reflecting layer, an ultraviolet ray to cure the ultraviolet ray curing resin can barely penetrate from the substrate side. Namely, since an ultraviolet ray irradiation can not reach the adhesive layer, it is difficult to cure the ultraviolet ray curing resin layer. The above mentioned conventional art has no disclosure of a method to solve the fundamental problem.

Since a medium with single side structure does not have a line symmetrical structure with respect to the upper and lower direction, it is liable to warp in either the upper or lower direction. That is, a protection layer 45 is generally formed in this technological field to protect the layer directly concerned with an optical information recording medium including optical disks from elements such as dust, humidity and external force. With respect to operation efficiency, strength and adhesion, ultraviolet ray curing resins are broadly used. However, conventional ultraviolet ray curing resins contract in the stage of polymerization and curing, and thus resulting in warp and/or distortion of the optical information recording medium. Another reason of warp and distortion is the volume change of the recording thin film layer. As to phase transition optical information recording media, as mentioned before, the recording thin film should be converted to crystal state in advance and at the time of the crystallization the recording thin film layer tends to contract, resulting in warp. By any reason, in the single side structure of FIG. 10A for example, the protection layer side tends to contract to become concave and the substrate side tends to become convex.

In initialization by flash irradiation, since heat is conveyed to the whole part of the medium at the one time, in addition to the above mentioned crystallization stress, stress by ultraviolet ray curing resin contraction is generated at the same time. That is, the method has problems such as difficulty in alleviating stress and tendency to cause warp and distortion remarkably.

In short, it is inevitable to have warp in some degree as a result of the initialization operation in disks with single side structure. As later described in examples, warp and distortion generated in a recording medium provides the major cause of malfunction of servo control including focusing and tracking in driving, and therefore it is undesirable. Another problem of a single side structure is that if the protection layer formed as the surface layer is not cured sufficiently and the optical information recording medium is exposed to a high temperature and high humidity condition, deterioration or peeling off of the recording thin film layer damages the function of the recording thin film layer.

A prior art comprises a step of applying heat treatment at 30° C. to 90° C. for 8 to 24 hours to an optical information recording medium after initialization in order to regain the adhesion of the boundary between the recording layer and the dielectric layer, which has been aggravated by the thermal stress generated from the recording layer at initialization and the volume change of the recording layer caused by the phase transition (the official gazette of the Japanese Patent Application Laid Open No. 5-151623, June 1993.

Nevertheless, the purpose of the method of the prior art is different from the purpose of the present invention of having a heat treatment in order to correct warp or distortion generated by the influence of heat generated in the initialization process. Further, although how the medium is maintained during heat treatment, or how the external force is applied become important as later explained in order to achieve the objects of the present invention, the prior art does not touch upon such elements at all. Besides, only examples of laser initialization are indicated, and thus no consideration is given at all to the problems stemming from temperature rise of the adhesion layer in the flash method.

As an apparatus of flashing a flash lamp, it has been common to have an electric circuit structure illustrated in FIG. 7. That is, the basic structure of the circuit comprises a main capacitor 32 to store the electric energy necessary to flash a flash lamp 31, a power source 33 to charge the electric energy to the main capacitor 32, a trigger coil 34 to generate the trigger voltage to commence flashing of the flash lamp 31, a discharge switch 35, a switch 36 between charge and discharge, and a resistor 37 for controling the current value at the time of charging. To initialize an optical information recording medium with an initialization apparatus having the circuit of FIG. 7, the below mentioned method is commonly employed. That is, the switch 36 is flipped to charging, and the output of the power source 33 is set to have the voltage the same as the voltage value sufficient to provide the necessary flash strength of the flash lamp 31. The voltage setting is determined mainly according to the withstand voltage of the main capacitor 32. Since the main capacitor 32 may break if the voltage is set to a voltage greater than the withstand voltage if the voltage exceeds the withstand voltage of the main capacitor 32 at the time of charging in full, it is common to have the voltage the same as the voltage to provide the flash strength. Since potential difference appears between the power source 33 and the terminal of the main capacitor 32, electric energy is supplied to the main capacitor 32 from the power source 33 via the resistor 37. The terminal voltage of the main capacitor 32 increases according to the supply of the electric energy. And the electric energy is supplied until the output voltage of the power source 33 and the terminal voltage of the main capacitor 32 become the same, namely, until the potential difference disappears. Accordingly, after charging the main capacitor 32, the switch 36 is turned off. Then the discharge switch 35 is turned on to have a pulse voltage generated at the primary side of the trigger coil 34. By this, a voltage of approximately 10 kV is generated at the secondary side of the trigger coil to flash the flash lamp 31. By the irradiated light of this flashing, the optical information recording medium 38 is initialized.

In general, the initialization process is conducted by the above mentioned method. By initialization by a flashed light, since the whole surface of the optical information recording medium is initialized collectively, the initialization (crystallization) itself is conducted in a period of 1 to 2 ms or shorter. Therefore, the time necessary for initialization is determined approximately by the charge time of the main capacitor 32.

The problem that the time necessary for the charging is rather long has existed so far. In initialization by flash light, most of the required time is the time for charging the capacitor, and therefore the flash method can be more advantageous by shortening the time for charging. The inventors of the present invention virtually measured the charging time of the main capacitor 32 to find out the following result. For example, the case of flashing twelve flash lamps 31 simultaneously with the voltage of both electrodes of the flash lamps 31 at the time of flashing 700 V is explained. Since the power source voltage is set to be 700 V and twelve lamps are flashed simultaneously, the capacitance of the main capacitor 32 becomes 36,000 µF. Under such conditions, the main capacitor 32 was charged and approximately 5 minutes were necessary as the charge time.

The relationship between the charge time and the obtained voltage of the main capacitor 32 measured is described by the solid line of FIG. 8. That is, since the main capacitor 32 barely stores charge just after starting charging, the terminal voltage of the main capacitor 32 is quite low in the vicinity of 0 V. Therefore since the potential difference between the power source voltage and the terminal of the main capacitor 32 is large and a large current flows, the main capacitor 32 is rapidly charged. However, as the charging process goes by, since the terminal voltage of the main capacitor 32 increases to narrow the potential difference with the power source voltage, a small current flows. As a consequence, a fairly long time was required to have the terminal voltage of the main capacitor 32 become the flash voltage of the flash lamp 31.

On the other hand; in a recent production process of optical information recording media, a through-put time for about 1 minute or less is often required. Therefore in order to shorten the initialization time by flashing light, it is necessary to shorten the charge time of the main capacitor as illustrated by the broken line in FIG. 8.

SUMMARY OF THE INVENTION

The first object of this invention is to provide a flash initialization apparatus which can optionally set the discharge emission time (irradiation time) and the discharge emission power (irradiation light power), and to provide a initialization process using the flash initialization apparatus with minimal thermal damage.

In order to achieve the above mentioned object, the production process of the present invention comprises controlling the waveform of the flash light irradiated for initialization and terminating the emission immediately after generation of crystallization. In order to achieve the above mentioned object, the production apparatus of the present invention comprises a support to support the optical information recording medium in which a substrate has a recording thin film layer exhibiting phase transition between the crystal phase and the amorphous phase thereon, a light source to discharge flash light by discharge, a storage circuit portion to store electric energy to supply to the light source, a trigger circuit portion to commence the discharge of the light source, and a flash exposure apparatus having a shutoff circuit portion to mandatorily terminate the discharge after a specified emission time to drop the emission intensity from a specified intensity to virtually zero level instantly. The above mentioned initial crystallization of the optical information recording medium includes charging the storage circuit portion by applying a specified voltage, operating the trigger circuit portion to start discharge for flashing light, and operating the shutoff circuit portion after a specified discharge time to mandatorily terminate the discharge.

In order to implement initialization by crystallization without giving thermal load to the resin substrate, the recording thin film layer or the protection layer, it is necessary to minimize the time in which the heat generated in the recording thin film layer diffuses to the surrounding portion. Since the virtual crystallization time is only on the order of several μs, it is important to increase the temperature of the recording thin film layer instantly to the crystallization temperature, and then to cool down rapidly after crystallization of the recording thin film layer. In other words, it is necessary to have high heating rate and cooling rate as much as possible where by the recording thin film layer is maintained in a high temperature for the time which the recording thin film layer needs for crystallization. However, in general, in applying a flash exposure, the tail of the emission tends to remain after the peak of the emission for a long time and it is considered to be the cause of a thermal damage to the recording thin film layer and the substrate.

In an aspect of the present invention comprising a shutoff circuit, since the flash irradiation to the optical information recording media can be provided within the minimum duration necessary for crystallization and the emission can be terminated mandatorily at an optional time, the effect of the tail of the emission can be eliminated to reduce the thermal damage at the time of initialization drastically.

Further, since the discharge itself is terminated at the time to maintain unused charge in the capacitor, the time required for the next charging can be far shorter than that of the first time. That is, when conducting initialization repeatedly, total time can be shortened to facilitate the production speed.

It is preferable to have the discharge time as long as 2 mS in this invention.

Further, it is preferable that the main component of the recording thin film in the optical information recording media is a Ge-Sb-Te alloy.

A second object of the present invention is to provide a flash initialization apparatus which allows a further shorter total initialization time in initializing repeatedly, and an initialization process using the apparatus with a short initialization time. That is, it is sought to provide a method to facilitate the charge time and an apparatus to achieve the method with attention to the fact that most of the time required for initialization is the time to charge the storage portion, which is the energy source of the flash light.

In order to achieve the above mentioned object, a production apparatus of the present invention is an apparatus to irradiate a flash light to an optical information recording media having a recording thin film which exhibits phase transition between the crystal state and the amorphous state on its substrate to convert a specified area of the recording thin film collectively to the crystal state, which is the initial condition, comprising a support to support the optical information recording medium, a light source to discharge flash light, a storage means to store energy to supply to the light source, a supply means to supply energy to the storage means, a discharge starting means to commence the discharge of the light source, a storage amount detecting means to detect the energy amount stored in the storage means, a supply amount setting means to determine the energy amount to supply, and a controlling means to control the supply amount determined by the supply amount setting means so as to be greater than the attained amount of the energy of the storage means according to the amount detected by the storage amount detecting means and to shut off the energy supply from the supply means to the storage means by means of a switch when the energy amount of the storage means attains the specified amount, and to start emission of the light source by means of the discharge starting means. By this, the charge time of the main capacitor is shortened and the discharge power can be set optionally.

Since the supply amount of the supply means is set to be greater than the specified amount of the attained energy amount of the storage means, even when the storage amount of the energy in the storage means becomes large, the specified difference of energy level can be secured between the energy level of the storage means and the energy level of the supply means. Therefore, since the decrease in the degree of the supply amount of the energy becomes smaller, the energy supply time for the storage means is shortened and the initialization time of an optical information recording medium can be dramatically shortened.

In the present invention, it is preferable that the energy supply amount of the supply means and the energy storage amount of the storage means are detected by the voltage amount, and the difference between the voltage amount of the supply means and the attained voltage amount of the storage means is kept nearly constant.

A third object of the present invention is to provide a production process in which warp and/or distortion (both are described "warp" hereinafter) of the medium is reduced in the process of forming the protection layer and the initialization process.

In order to achieve the above mentioned object, a production process of the present invention uses a method of completely curing an optical information recording medium comprising a recording thin film layer which exhibits phase transition between the crystal phase and the amorphous phase on the substrate and a protection layer of a cured curing resin including an ultraviolet ray curing resin on the top layer, by applying an annealing process after the initial crystallization process.

Since polymerization of the ultraviolet ray curing resin used as a material of the protection layer is incomplete before initialization, structural flexibility remains in some degree. Therefore, by applying an annealing process, the ultraviolet ray curing resin of the protection layer can be cured completely to complete the protection layer as the optical information recording medium. The annealing process is implemented while applying force to correct the warp, or applying the external force to correct the warp actively. By this arrangement, the warp generated in each process can be corrected and after annealing it can be fixed in a state without warp.

By this, the credibility of optical information recording media can be increased and the number of defective products caused by the warp generated in the initialization process can be reduced to increase yield in production.

It is preferable to use an optical information recording medium having the structure comprising a first dielectric layer, a recording thin film layer, a second dielectric layer and a reflector layer formed on the substrate having a protection layer formed as the top layer.

It is further preferable that an alloy thin film comprising Ge-Sb-Te as the main component is used as the recording thin film layer.

It is further preferable that the annealing process includes a corrective measure to eliminate warp of the optical information recording media or a corrective measure to apply external force in the direction to correct the warp.

It is further preferable that the annealing process is conducted with a corrective treatment, with an optical information recording medium having a disk shape placed on a base having a hole with diameter slightly smaller than the outside diameter of the optical information recording medium, with the center of the optical information recording medium and the center of the hole superimposed and the convex surface of the optical information recording medium upward. Then the center portion of the optical information recording medium is loaded or fixed to have the optical information recording medium attain a concave or straight shape.

It is further preferable that the annealing process is conducted with a corrective treatment, with the surface of at least one selected from the group consisting of the substrate surface and the protection layer surface left turned down to a smooth plane.

It is further preferable that the annealing process is conducted with a corrective treatment, with at least one selected from the group consisting of the substrate surface, the inner periphery of the protection layer surface and the outer periphery of the protection layer surface is pressed to an object having a smooth plane.

It is further preferable that the smooth plane is a plane of an object having heat resistance at a temperature higher than that of the annealing process, and the annealing process is conducted with the optical information recording medium placed on the smooth surface of the object which has been heated to a specified temperature.

It is further preferable that the annealing process is conducted with a corrective treatment, with a plurality of optical information recording media having a single side structure piled and applied with a force from both sides.

It is further preferable that the temperature of the annealing process is the same as or lower than the temperature at which the phase transition of the recording thin film layer occurs.

It is further preferable that the annealing temperature is 100° C. or lower. The lowest limit is approximately 60° C.

It is further preferable that the initial crystallization process is conducted by flash exposure.

As another method to achieve the above mentioned object, a production process of the present invention is a production process of an optical information recording material having the structure comprising a recording layer of a multi-layered structure including a recording thin film layer which exhibits phase transition between the crystal phase and the amorphous phase and a protection layer of a curing film including an ultraviolet ray curing resin on the recording layer formed on the substrate, comprising an ultraviolet ray irradiation process to irradiate an ultraviolet ray while applying a corrective force to the substrate surface opposite to the recording layer and the protection layer of the optical information recording material after forming the ultraviolet ray curing resin layer, and an initial crystallization process after the end of the ultraviolet ray irradiation process.

Since an optical information recording medium (hereinafter abbreviated optical disk) with single side structure generally has a warp generated in the protection layer formation and the warp generated in initialization in the same orientation, the degree of the optical disk after such treatments is multiplied to ruin the flatness of the layer concerning the recording of the optical disk. Therefore, by forming a protection layer while applying a corrective force to the orientation opposite to the orientation of warp at least in the protection layer curing process, warp after initialization can be curbed.

It is preferable that the initialization process is conducted with a corrective force applied.

It is further preferable that an annealing process by heating the optical information recording medium is conducted between the ultraviolet ray irradiation process and the initialization process.

It is preferable that the annealing process is conducted with a corrective force applied.

It is preferable that the heat source of the annealing process is the irradiation from an infrared lamp.

It is preferable that the initialization process is conducted by a flash light irradiation.

By the present invention, the warp and/or distortion of an optical disk medium of phase transition type between the amorphous phase and the crystal phase is curbed and the servo characteristics can be improved.

A fourth object of the present invention is to provide a structure of an optical information recording medium to reduce the number of production steps of a medium with double sides structure suitable to a flash initialization method, and a production process of the optical information recording medium.

In order to achieve the above mentioned object, the present invention has a structure having two pieces of optical information recording materials comprising a recording thin film layer which has optically detectable changes by laser beam irradiation on a transparent substrate, affixed with the multi-layered structure film side butted together by means of a resin including an ultraviolet ray sensitive curing component. In addition, at least one of the two optical information recording materials has a transmissivity of about 3% or more in the ultraviolet ray sensitive wavelength range of the resin. By having the above mentioned structure, the adhesion layer can be cured by ultraviolet ray irradiation from outside from the substrate side.

In this case when recording thin film layers using the change of optical characteristics of phase transition between the amorphous phase and the crystal phase are used and at least one of the optical information recording materials of the above mentioned recording thin film layers is in the amorphous state, it is preferable that the resin has approximately 3% or more of transmissivity in the ultraviolet ray sensitive wavelength range.

It is further preferable that an alloy comprising Au as the main component described by the formula: $Au_{100-x}M_x$, wherein M is a metal element such as Cr, Al, Ag, Cu, Ni, Si, Pt, and $100 > x \geq 0$ is used as the metalic reflection layer.

Such optical information recording media can be obtained in a production process comprising, a film forming process in which the multi layered structure film of at least one of the above mentioned two optical information recording materials is formed with the ultraviolet ray sensitive wavelength range of the resin having approximately 3% or more of transmissivity, a positioning process in which the above mentioned two optical information recording materials are positioned with the surface having the multi layered structure film thereon opposing to each other, a filling process in which the above mentioned resin is filled to the space between the above mentioned opposing multi layered structure films, and an exposure process in which the above mentioned resin is cured with the exposure to the ultraviolet ray.

In general, the curing speed of an ultraviolet ray sensitive resin depends on factors such as wavelength of the ultraviolet ray irradiation and quantum efficiency of the sensitive component, which is proportional to the ultraviolet ray irradiation intensity. However, according to the results of experiments conducted by the inventors of this invention showed that the rate determining step for curing by the ultraviolet ray irradiation, although the curing speed is subject to slight change according to the irradiation intensity, depends mainly on the wavelength of the ultraviolet ray. That is, it was found that if a specific wavelength to react the component which starts polymerization by ultraviolet ray irradiation exists, even if the transmissivity is as high as 3%, the irradiation intensity to the ultraviolet ray irradiation sensitive component is sufficient and the effect on the curing speed is not much. Therefore, in the above mentioned structure, since an optical information recording medium with double sides structure can be formed by only filling an ultraviolet ray curing resin in the space between the surfaces of the two disks to be bonded and irradiating the ultraviolet ray, the number of steps of the production process can be reduced remarkably compared with conventional methods.

Herein it is preferable that the exposure is provided from the both sides of the optical information recording materials.

It is further preferable that the optical information recording medium is initialized by irradiating an energy line after exposure process.

It is further preferable that a laser beam is used as the energy line.

It is further preferable that a flash light is used as the energy line.

It is further preferable that at least one of the two optical information recording materials is a type used only for reproduction.

BRIEF DESCRIPTION OF THE DRAWINGS

FIGS. 3A to 3D are graphs illustrating the results of observation with oscilloscope of emission waveform of the flash light of the flash initialization apparatus of the present invention, wherein;

FIG. 3A illustrates the case of discharge emission without a shutoff circuit of the present invention;

FIG. 3B illustrates the case of starting operation of a shutoff circuit of the present invention 2 ms after starting emission;

FIG. 3C illustrates the case of starting operation of a shutoff circuit of the present invention 1 ms after starting emission; and FIG. 3D illustrates the case of starting operation of a shutoff circuit of the present invention 0.5 ms after starting emission.

FIGS. 4A, 4B are sectional views of structures of embodiments of optical disk media for initial crystallization treatment applying the initialization process of the present invention, wherein;

FIG. 4A illustrates an embodiment of a slow cooling structure; and

FIG. 4B illustrates an embodiment of a rapid cooling structure.

FIGS. 10A, 10B are section views of embodiments of phase transition recording media, wherein:

FIG. 10A illustrates the case of a disk structure with single side structure; and FIG. 10B illustrates the case of a disk structure with a conventional double sides structure formed with a hot melt adhesive.

FIGS. 11A to 11D are diagrams illustrating processes of annealing using a disk fixing jig in production processes of optical information recording media of the present invention, wherein;

FIG. 11A illustrates the case of fixing the inside perimeter of an optical information recording medium;

FIG. 11B illustrates the case of fixing the outside perimeter of an optical information recording medium;

FIG. 11C illustrates the case of fixing the inside perimeter and the outside perimeter of an optical information recording medium independently; and FIG. 11D illustrates the case of fixing an optical information recording medium to provide a warp angle in the opposite direction with respect to the warp angle resulting from processing before the annealing process.

DESCRIPTION OF THE PREFERRED EMBODIMENTS

Hereinafter preferred embodiments of the present invention will be further explained with reference to drawings. An embodiment to achieve the first object of the present invention, that is, to provide a flash initialization apparatus wherein a discharge emission time (irradiation time) and discharge emission power (irradiation power) can be optionally set, and an initialization process having small thermal damage using the apparatus initialization apparatus.

Figure 1:
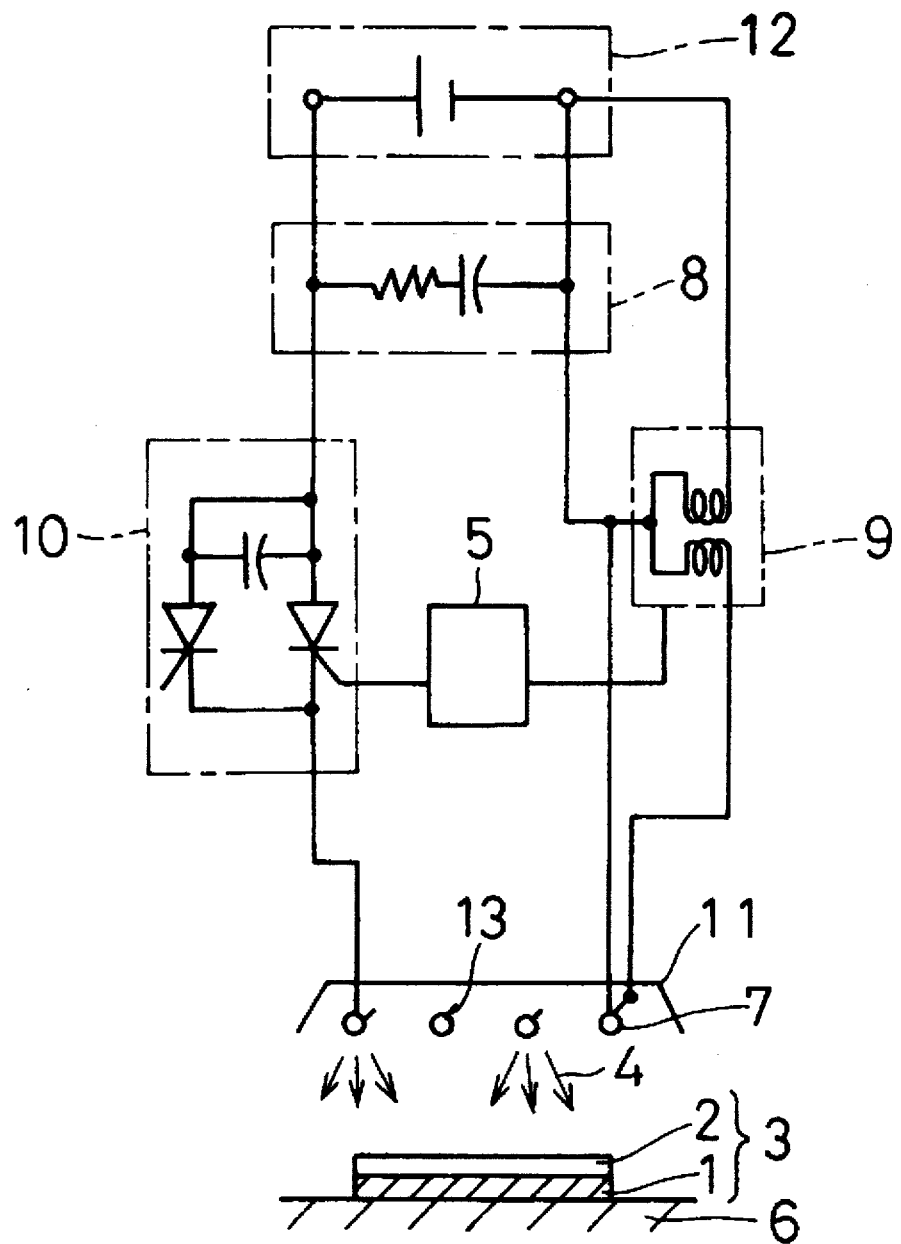
FIG. 1 is a diagram illustrating the principal structure of an embodiment of initialization apparatus comprising a shutoff circuit applied in the initialization process of the present invention.

FIG. 1 is a diagram illustrating a principal structure of an embodiment of a flash initialization apparatus which can optionally set the discharge emission time (irradiation time) and the discharge emission power (irradiation power). By using the apparatus, an initialization with a low thermal damage can be conducted.

As to initialization, an optical information recording medium 3 which comprises a recording thin film 1 of a phase transition material initially in the amorphous state on a resin substrate 2 is placed on a support 6 with the substrate surface upward. Although the substrate surface is placed upward herein, it can be placed downward and any embodiment can be optionally used according to the apparatus structure.

Numeral 7 is a flash light source connected to a storage circuit portion 8 to store the electric energy. In this embodiment, a twenty four xenon flash lamps with 35 cm length are used and located on a plane with a 1 mm interval between each other.

A storage circuit 8 comprises a resistor and a capacitor and is connected to a power source 12 to be charged to a specified voltage.

Numeral 9 is a trigger circuit which is to be operated after charging the capacitor of the above mentioned storage circuit portion to a specified voltage, to change the state of the inside of the flash light source to be conductive and release the charge stored in the above mentioned storage circuit into the discharge circuit at one time. As a consequence, a strong flash light 4 is discharged from the flash light source 7. Although a reflector 11 improves the irradiation efficiency to the medium, it is not an indispensable element of the present invention.

The recording thin film 1 absorbs the flash light 4, thereby raising its temperature to have phase transition to the crystal state. Further, a discharge shutoff circuit portion 10 is provided in the discharge circuit to mandatorily terminate the discharge after discharging for a specified time to lower the emission intensity instantly to the virtual zero level.

Figure 2:
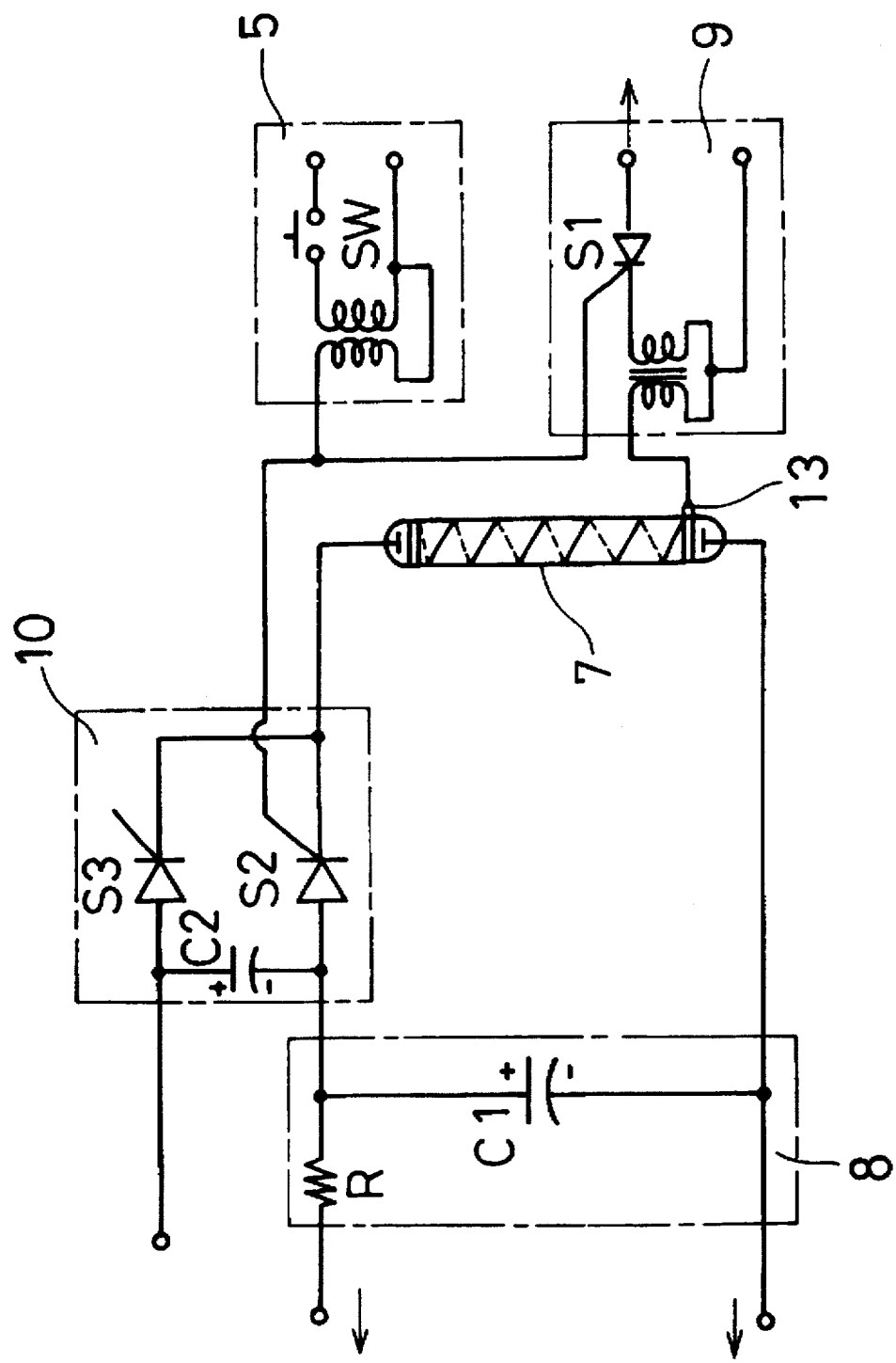
FIG. 2 is a diagram illustrating the operation principle of the shutoff circuit portion 10 used in the initialization apparatus of the present invention.

The operation principle of the shutoff circuit 10 used in the initialization apparatus of the present invention will be described with reference to FIG. 2. As a premise of discharge, the capacitor C1 of the storage circuit portion 8 is charged to a specified voltage in advance. Then an on signal is applied to the gate terminal of the SCR (hereinafter described thyristor) S1 of the trigger circuit 9 by means of a switch circuit 5 to apply voltage between the both ends of the trigger trans of the trigger circuit 9.

The above mentioned voltage is increased and a high voltage is applied to the trigger electrode of the flash light source 7, and also turns on the thyristor S2 of the shutoff circuit 10. As a consequence, the electric resistance of the inside of the flash tube drastically drops and the voltage between both ends of the main capacitor C1 is applied between the both ends of the flash tube to start discharging between the cathode and the anode of the lamp to have emission.

To mandatorily terminate the discharge, an on signal is applied to the gate terminal of the thyristor S3 in the shutoff circuit. In this case, a timer is provided in the circuit to give an on signal (not illustrated in the figure) and set to give the on signal after a specified time from starting the discharge.

A charged capacitor C2 to generate a shutoff current is connected in the shutoff circuit. When the thyristor S3 is on, the voltage between the both ends of C2 is applied on the thyristor S2 to the reverse direction and by the generation of the reverse current, S2 is switched to be off instantly. Consequently, discharge from the main capacitor can be terminated. That is, independent from the time constant of the circuit, an emission time can be set optionally.

Examples of shutoff circuits include the VARICUT device of SUNSTAR STROBO CO. (VARICUT24). In this case, the effective emission time can be set optionally in the range of 0.1 to 10 msec.

Figure 3A:
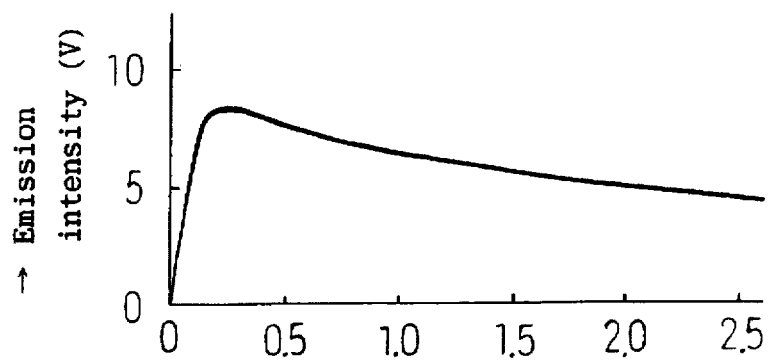
Figure 3B:
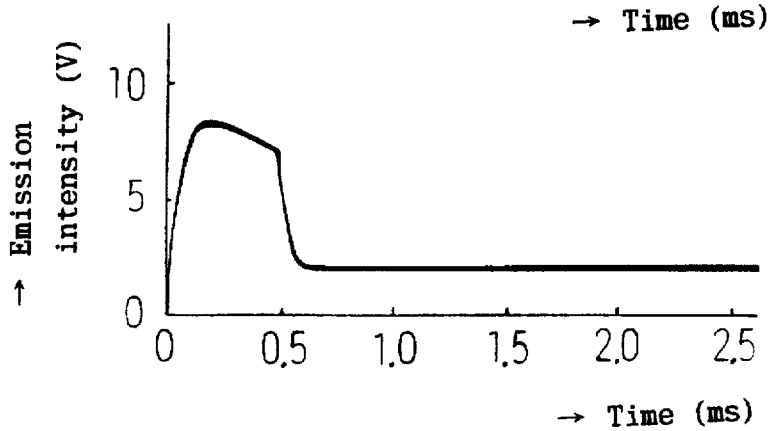
Figure 3C:
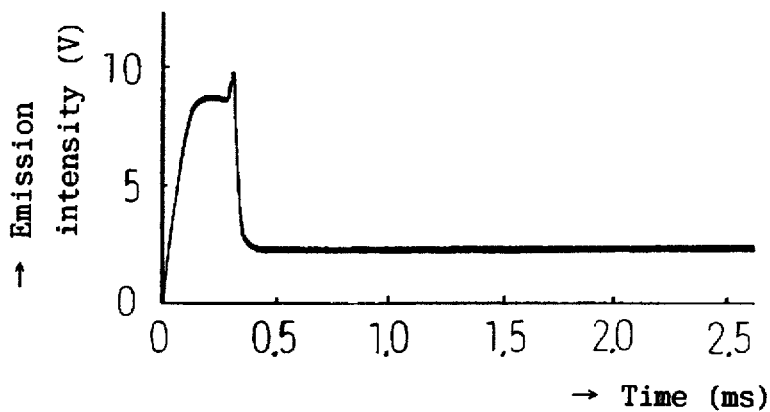

FIGS. 3A–3D illustrate examples of emission patterns with the emission discharged from the xenon lamp to the pin diode using the circuit. The horizontal axis of each figure is a time axis and one unit in FIGS. 3A–3C is 0.5 ms, 0.2 ms in FIG. 3D. The vertical axis of each figure is the emission intensity calculated in terms of the output voltage of the photodetector. Further, the capacitance of the storage portion in the circuit is 6000 μF and the charge voltage is 800 V.

Figure 3D:
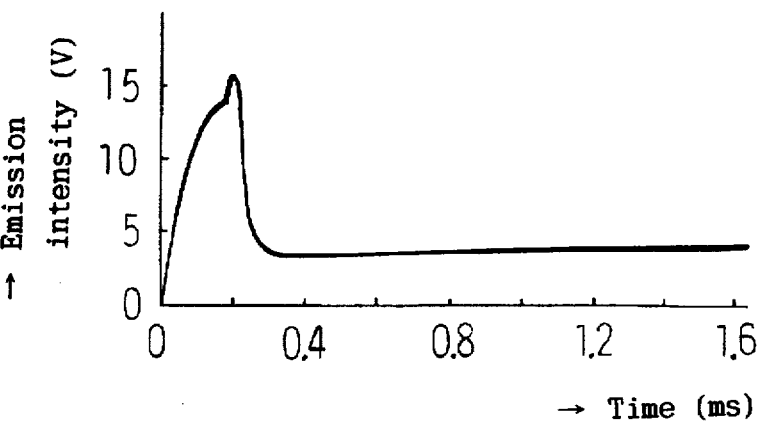

FIG. 3A is the case without operating the discharge shutoff circuit 10, and FIGS. 3B–3D are the cases with the operation of the discharge shutoff circuit 10 with the set emission time of 2 mS, 1 mS, 0.5 mS, respectively.

From the figures, it can be observed that the emission terminates completely after the set time and rapidly drops to zero level. The emission intensity rises instantly just before the termination in FIGS. 3B–3D because the current from the capacitor C2 flows also to the flash tube momentarily.

Figure 4A:
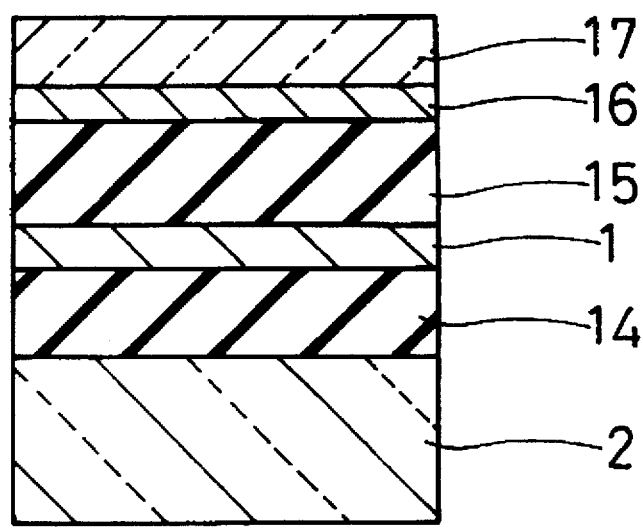

FIG. 4A is a section view illustrating an embodiment of the structure of an optical disk medium for initial crystallization treatment applying the initialization method of the present invention. It is called the slow cooling structure in general. On a substrate 2 of polycarbonate having 200 mm diameter and 1.2 mm thickness, a ZnS-SiO$_2$ (SiO$_2$:20 mole %) film having 90 nm thickness as the lower coating dielectric layer 14, a Ge$_2$Sb$_2$Te$_5$ alloy thin film layer having 30 nm thickness as the recording thin film layer 1, a ZnS-SiO$_2$ (SiO$_2$:20 mole %) film having 154 nm thickness as the upper coating dielectric layer 15 and an Au thin film layer having 10 nm thickness as the reflecting layer 16 were laminated by sputtering.

The recording film of as deposited state was amorphous. Then an ultraviolet ray curing resin was spin coated as the uppermost layer to form a layer of 20 μm thickness, followed by the curing by the mercury lamp to form the protection layer 17.

Table 1 illustrates the results of the case applying the flash irradiation of FIG. 3 onto the medium with the structure of FIG. 4A. The distance between the lamp and medium was 10 mm, and the charged voltage was 650 V, 675 V, 700 V, 750 V, 800 V, respectively.

TABLE 1

Relationship between the flash irradiation condition and initial crystallization state 1

|   | 650 V | 675 V | 700 V | 750 V | 800 V |
|---|---|---|---|---|---|
| A | F | D | D | D | D |
| B | F | P | G | G | D |
| C | F | F | P | G | G |
| D | F | F | F | P | G |

Note: In Table 1, "G" denotes good, "D" damaged, "P" partially remained, "F" failure, respectively.

In Table 1, the result "good" means that the entire surface of the disk was crystallized without suffering thermal damage such as cracking or peeling off. "Damaged" means that some damage including wrinkle or cracking was observed regardless of whether the disk was crystallized or not. "Partially remained" means that some part of the disk which was exposed to the emission with comparatively weak emission intensity was observed uncrystallized. And "failure" means that the disk was not crystallized at all. Although whether crystallized or not could be judged easily by naked eyes because the optical density was large, it was examined by X-ray diffraction method as well for certainty.

As is apparent from the results of Table 1, it was learned that in the condition of A with the irradiation without operating the shutoff circuit, thermal damage occurred before the disk is crystallized sufficiently. It was further learned that by operating the shutoff circuit to cut off the tail of the emission extra heating can be avoided to realize crystallization without thermal damage.

Although not described in Table 1, in the conditions with emission times longer than 2 mS and shorter than 0.5 mS were also examined. As a result, with a time until operating the shutoff ciruit of 3 mS, initialization could be conducted in some conditions. However, if the time was longer than 3 mS, damages were found remarkably and thus, it is not preferable. On the other hand, with a time shorter than 2 mS, initialization was conducted preferably in many conditions. Further, with an irradiation time shorter than 0.5 mS, such as 0.2 mS and 0.1 mS, initialization could be conducted without a damage. However, in this case, since the necessary charge voltage becomes greater such as 2 kV and 4 kV, a power source with a greater power becomes necessary.

The above mentioned disks, which were subjected to the initial crystallization, were examined in a evaluation deck for recording and reproduction. Disks were driven at the linear velocity of 27 m/s, and a laser of 780 nm wavelength (numerical aperture: NA=0.55) was binarily modulated with the peak power of 24 mW and the bias power of 10 mW and a signal with the recording frequency f1=18 MHz and a signal with the recording frequency f2=6.75 MHz were recorded by overwriting alternately. The C/N and the erasure ratio of f1 were measured and it was learned that the C/N was 52 dB and the erasure ratio was 28 dB and thus the initialization was conducted successfully.

Figure 4B:
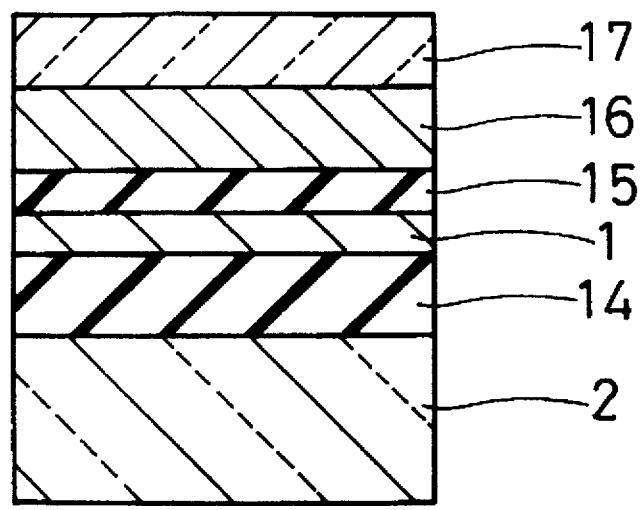

Next with disks with another type of structure generally called rapid cooling structure, the initial crystallization method of the present invention was conducted. As illustrated in FIG. 4B, in this embodiment on a polycarbonate resin substrate with 13 cm diameter, a ZnS-SiO$_2$ (SiO$_2$:20 mole %) film having 170 nm thickness, a GeBi$_2$Te$_4$ alloy thin film having 25 nm thickness, a ZnS-SiO$_2$ (SiO$_2$:20 mole %) film having 45 nm thickness and AlCr (Cr:3 atomic %) were formed successively by sputtering. The recording film of as deposited state was amorphous.

Then an ultraviolet ray curing resin was spin coated as the uppermost layer to form a layer of 20 μm thickness, followed by the curing by the mercury lamp to form the protection layer. The initialization experiment the same as the previous embodiment was conducted to the optical disks of this structure. In this case, the charged voltage was 625 V, 650 V, 675 V, 700 V, 750 V, respectively.

TABLE 2

Relationship between the flash irradiation condition and initial crystallization state 2

|   | 625 V | 650 V | 675 V | 700 V | 750 V |
|---|---|---|---|---|---|
| A | F | D | D | D | D |
| B | F | F | G | G | D |
| C | F | F | P | G | G |
| D | F | F | F | P | G |

Note: In Table 2, "G" denotes good, "D" damaged, "P" partially remained, "F" failure, respectively.

In this embodiment with a medium structure different from the previous embodiment, as apparent from the results of Table 2, it was learned that in the condition with irradiation without operating the shutoff circuit, thermal damage occurred before the disk is crystallized sufficiently. It was further learned that with the condition of operating the shutoff circuit, an appropriate charge voltage exists according to the emission time, and it was proved that crystallization without thermal damage can be achieved under the condition with the appropriate charge time.

Conditions with emission times longer than 2 mS and shorter than 0.5 mS were examined as conducted in the case of the medium of slow-cooling structure to show the similar tendency.

The above mentioned disks, which were subjected to the initial crystallization, were examined in a evaluation deck for recording and reproduction. Disks were driven at the linear velocity of 10 m/s, and a laser of 780 nm wavelength (numeral aperture: NA=0.50) was binarily modulated with the peak power of 14 mW and the bias power of 7 mW, and a signal with the recording frequency f1=6.66 MHz and a signal with the recording frequency f2=2.5 MHz were recorded by overwriting alternately. The C/N and the erasure ratio of f1 were measured and it was learned that the C/N was 55 dB and the erasure ratio was 26 dB and thus the initialization was conducted successfully.

As seen from the above mentioned 2 embodiments, the initialization process and the initialization apparatus of the present invention can be applied to media having different materials with respect to each layer and film thickness regardless of the structure of the media.

Examples of substrate materials include transparent high polymer materials such as poly methyl methacrylate (PMMA) and poly olefin, transparent inorganic materials such as glass, and metals such as Cu and aluminum.

Examples of dielectric materials include oxides such as Zr-O, Ta-O, Ge-O, Ti-O, and Al-O, nitrides such as Al-N, Zr-N, Si-N, and Ti-N, carbonates such as Si-C, and Ti-C, and fluorides such as Ca-F, and La-F.

As the recording thin film layer, phase transition recording thin films utilizing phase transition including Ge-Sb-Te system or a system with an element such as Co, Bi, Pd, O, N, and Se added to Ge-Sb-Te system or a system with Ge-Sb-Te system partially substituted by such elements; Sb-Te system, In-Sb-Te system, Ga-Sb system, Ge-Te system, Ag-Sb-In-Te system, Ge-Bi-Te system, Ge-Sn-Te system, Ge-Bi-Te-Se system and Ge-Te-Sn-Au system or a system with additives such as oxide and nitrogen added to such systems can be used.

Examples of reflecting layer materials include metals such as Au, Al, Ni, and Cr, and an alloy using the metals as the base.

These can be applied to media with double sides structure formed with two pieces of the medium illustrated in FIG. 4A or FIG. 4B bonded together. That is, the present invention is independent from the medium structure.

The irradiation power necessary for the initial crystallization can be changed by the distance between the medium and the light source. That is, if they get closer, a shorter irradiation time or a lower charge voltage can be enabled. On the contrary, if they get farther, a longer irradiation time or a higher charge voltage becomes necessary. How the above mentioned distance is settled is a design item of the apparatus.

The next embodiment deals with the time necessary for charging. Corresponding to the previous FIGS. 3A to 3D, the time of initially charging to 750 V and the time of recharging to the voltage level before the discharge after discharging once were measured. The charge time with the voltage maintained at 750 V level was measured. The results are shown in Table 3.

TABLE 3

| | Discharge time and charge time | |
|---|---|---|
| | 1st time | 2nd time |
| A | 4 min. | 4 min. |
| B | 4 min. | 2 min. |
| C | 4 min. | 1 min. |
| D | 4 min. | 30 sec. |

As shown in the results of Table 3, the first charging took 4 minutes and recharging after one discharge varied depending upon the discharge time. That is, when the discharge time was 2 mS, recharging took only 2 minutes, which is half of the initial charging. Similarly, it is learned that in the conditions that the discharge time was 1 mS and 0.5 mS, the recharging time was shortened to 1 minutes and 30 seconds respectively. That is, it was proved that the time required for initial crystallization was drastically shortened by using the discharge shutoff circuit to have just the minimum necessary discharge emission.

Next an embodiment to achieve the second object of this invention, namely to shorten the time required for flash initialization will be explained. In this embodiment, attention is paid to that fact that the most of the time required for the flash initialization process is the time for charging the storage portion, which is the energy source to the flash light, and a process to facilitate the charge time and an apparatus to achieve the process are provided.

Figure 5:
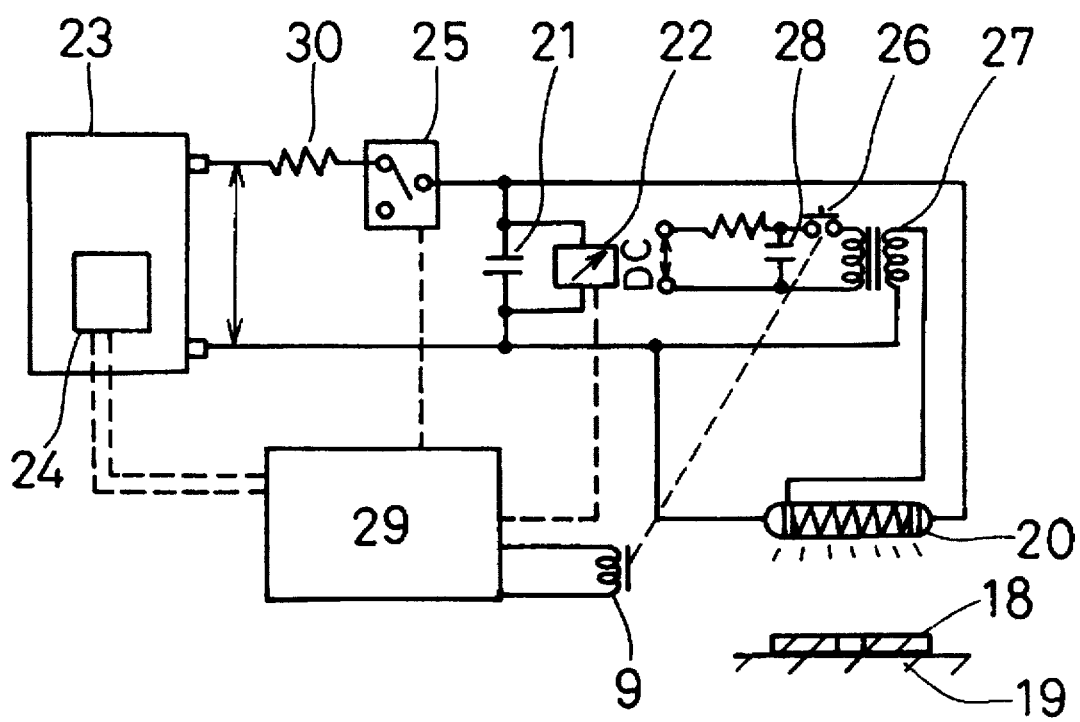
FIG. 5 is a diagram to illustrate an embodiment of initialization apparatus of an optical information recording medium of the present invention with a structure provided with a function to shorten the charge time.

FIG. 5 is a diagram illustrating the structure of the initialization apparatus which enables a shorter initialization time. At the time of initialization, an optical information medium 18 is placed on a support 19. A flash lamp 20 (hereinafter abbreviated "lamp") is located opposing the optical information recording medium 18. Although only one lamp 20 is illustrated in FIG. 5, a plurality of straight lamps may be juxtaposed, or a lamp with a spiral shape may be used according to the shape and the surface area of the medium.

A main capacitor 21 to store the electric energy necessary for flashing the lamp 20 is connected to the terminal of the lamp 20 in parallel, and a voltmeter 22 to detect the charged amount as the terminal voltage of the main capacitor 21 is connected to the main capacitor 21 in parallel. The voltmeter 22 has a output terminal to output the measured voltage to another circuit.

Numeral 23 is a power source to charge the main capacitor. The power source 23 has a voltage setting circuit 24 to automatically control the output terminal voltage of the power source.

Numeral 25 denotes a switch to switch charge, shutoff, and discharge of the excessive charged amount.

A relay 26, a trigger coil 27, and a trigger capacitor 28 are provided for flashing the lamp 20. The trigger capacitor 28 is charged to the voltage Vt through a resistor 30 in advance. With the condition, when the relay 26 is closed, the energy stored in the trigger capacitor 28 is converted to an energy of a high frequency and a high voltage by the trigger coil 27 to be applied to the trigger electrode of the lamp 20.

The high frequency and the high voltage cause dielectric breakdown of xenon gas inside of the lamp 20 to start drastic discharge between the cathode and the anode. By this, the energy stored in the main capacitor 21 becomes light energy to flash instantly.

A control means 29 is located for the control of signals to determine the set voltage of the setting circuit 24, the control of signals to change the position of the switch 25, and the control of signals to close the relay 26.

The operation to initialize the optical information recording medium 18 with the above mentioned apparatus is described hereinafter.

The emission intensity of the lamp 20 is determined by the charge amount of the main capacitor 21 to store the electric energy necessary for flashing the lamp 20. If the capacitance is constant, the emission strength is determined by the amount of the terminal voltage, namely the voltage between the terminals of the lamp, of the main capacitor 21. Although the maximum tolerance of the applied voltage or the lower limit of the emission limit depends on the design of the lamp 20, an embodiment with a lamp of rated 700 V is explained herein.

In order to apply the above mentioned 700 V between terminals, the voltage of the main capacitor 21 needs to be charged to be 700 V. Therefore:

1) When the charge completion voltage of the main capacitor 21 is set to be 700 V by the controlling means 29, signals are sent from the controlling means 29 to switch the switch 25 to the charge position, and the charging is commenced.

2) At the same time, signals are sent from the controlling means 29 to the setting circuit 24, and the output voltage of the power source 23 is set.

3) Since the terminal voltage of the main capacitor 21 increases as the charging proceeds, the terminal voltage is detected by the voltmeter 22, and the measured value is sent to the controlling means 29.

4) The controlling means 29 sends signals so that the potential difference between the output voltage of the power source 23 and the terminal voltage of the main capacitor 21 is always kept at 700 V, and the setting circuit 24 keeps the output voltage of the power source 23 higher than the measured voltage at the voltmeter 22 by 700 V.

5) When the voltmeter 22 detects 700 V or higher, the controlling means 29 sends signals to switch the switch 25 to the shutoff position, and the charging of the main capacitor 21 terminates.

6) After completing charging, the controlling means 29 sends signals to the relay 26, by closing the relay 26 the lamp 20 flashes, and the flash light is irradiated to the optical information recording medium 18 to conduct initialization.

Figure 6:
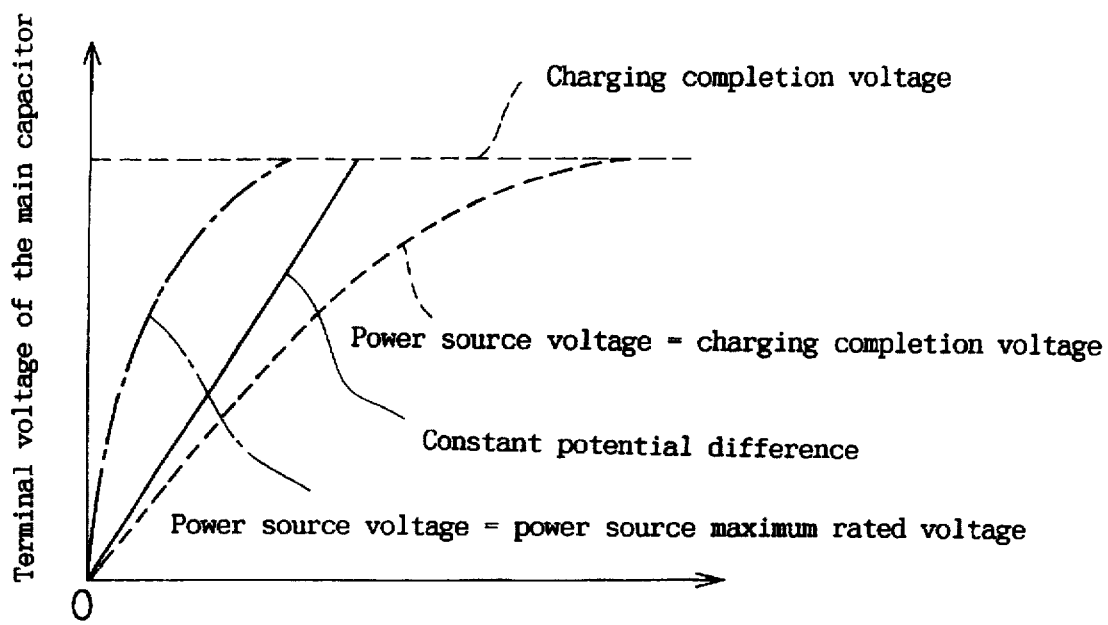
FIG. 6 is a graph illustrating the relationship between the charge time and the charge voltage at the time of charging the main capacitor for storing emission energy of the flash lamp in an embodiment of the present invention, showing the difference of charging speed according to the conditions of voltage application to the main capacitor.
Figure 7:
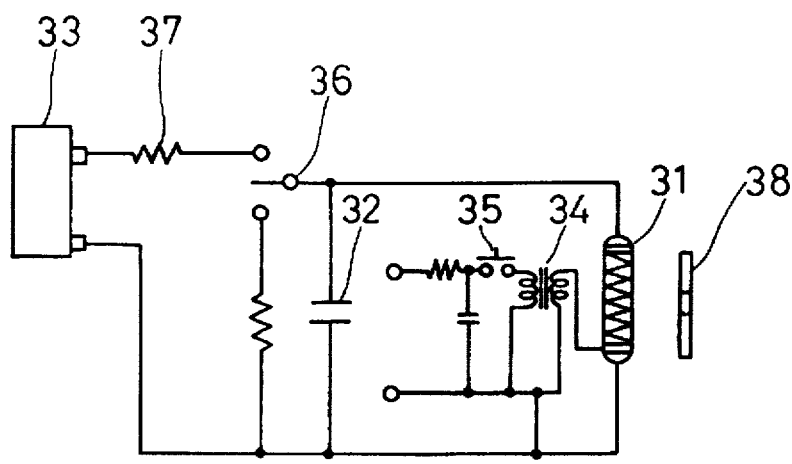
FIG. 7 is a diagram illustrating the circuit structure of a conventional initialization apparatus.
Figure 8:
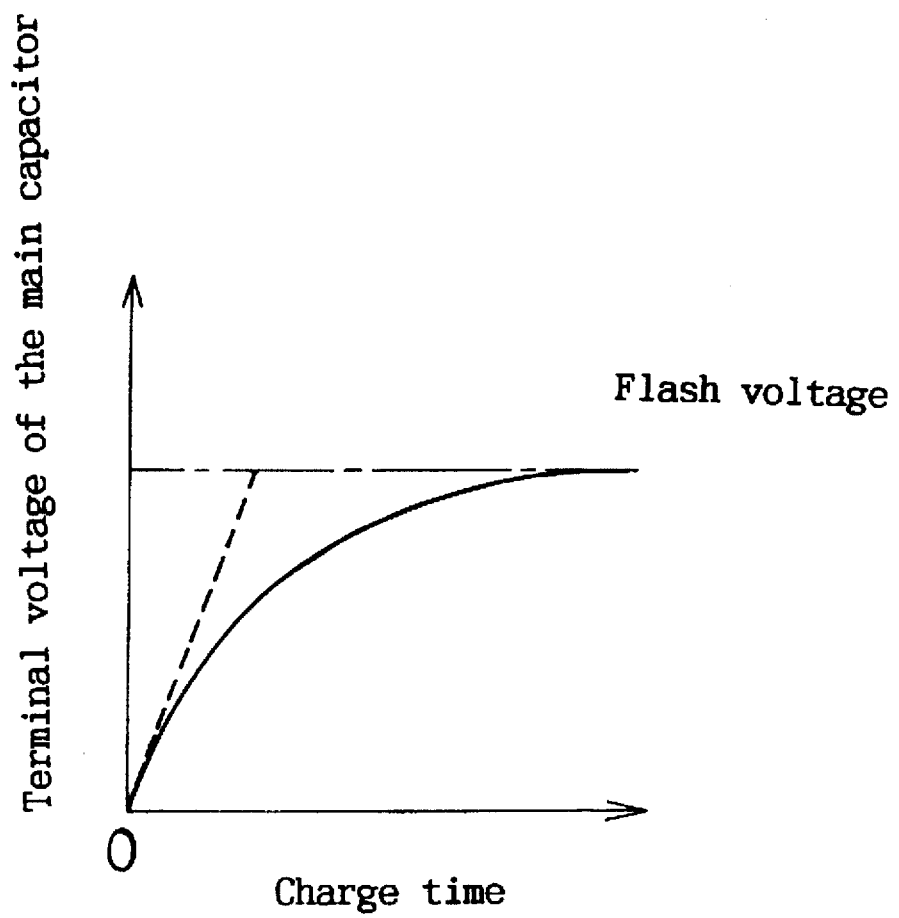
FIG. 8 is a graph illustrating the process of charge time and the charge voltage of the main capacitor of a conventional initialization apparatus.

FIG. 6 illustrates the relationship between the charge time and the terminal voltage of the main capacitor 21. The solid line in the figure illustrates the case with the constant potential difference of 700 V of the above mentioned embodiment. The terminal voltage of the main capacitor 21 increases linearly to the charge terminating voltage. In comparison with the case with a constant applied voltage illustrated by the curved broken line in the figure, it is learned the case with the process of this embodiment completes charging in a much shorter time. Since the increasing rate until charge completion time of the terminal voltage of the main capacitor 21 is constant in this process, the charge completion time can be easily calculated, providing convenient.

In addition to the above mentioned setting method, there are various other ways to set the output voltage of the power source 23. More simply, the output voltage can be fixed at the upper limit of the set voltage of the power source 23. That is, when the maximum rated voltage of the power source 23 is 1 kV, for example, the output voltage of the power source 23 is set to be 1 kV by the control of the setting circuit 24 via the controlling means. In this case, since the potential difference just after starting charging is 1 kV and the potential difference after charging termination becomes 300 V if the charge completion voltage of the main capacitor 21 is 700 V, the terminal voltage of the main capacitor 21 changes as illustrated by the chain line in FIG. 6 to set the voltage of the power source 23 to charge in a time shorter than the case of setting the voltage of the power source 23 to be 700 V, which is the voltage to terminate the charging.

Anyway, by keeping the output voltage of the power source 23 higher than the charge completion voltage of the main capacitor 21 in this invention to have a highest possible potential difference between them, the current value flowing into the main capacitor is controlled to increase. By this, the charge time can be shortened and the time required for initialization can be reduced.

As mentioned above, one characteristic of the initialization apparatus of this invention is to comprise a supply amount setting means provided for the energy supplying means, a storage amount detecting means to detect the energy amount stored in the energy storage means, and a controlling means to output signals to the supply means, a switching means and a discharge starting means based on the output from the supply setting means and the storage detecting means.

Although subjects of detection by the supply amount setting means and the storage amount detecting means include the charge amount and the voltage, it is easy and preferable to administer by voltage in the aspect of flashing the flash light.

Another characteristic of the initialization apparatus of this invention is to provide a controlling means to control the supply means for keeping the supply amount such as the charging voltage to be greater than the specified attained amount of the set value such as the set voltage of the storage means by monitoring the detected amount such as the terminal voltage of the main capacitor. Herein the specified attained amount of the storage means is the energy amount of the voltage value required for flashing light. The set value can be the same as the specified attained value and the set value also can be set slightly higher than the specified attained value in order to start discharge smoothly. However, the above mentioned set values of the storage means should naturally be set lower than the maximum rated amount of the storage means.

In principle, if the supply amount is greater than either of the specified attained amount and the set value of the attained amount of the storage means, effects of the present invention can be provided. If the difference between them becomes greater, the effects become more remarkable. However, in the case of detecting by voltage, in general, since the voltage fluctuation of the supplying means should be considered, if the supply amount is greater than the specified attained amount or the set value of the attained amount of the storage means by 1.1 times or more, effects can be provided, and with respect to the actual production, preferably it is greater by 1.3 times or more. As to the upper limit, in common, there is a limit with respect to the ability of the supplying means and since a supply means having an ability of about 5 times or less can be obtained easily, it is preferable. It is natural that the ratio between the supply amount and either of the attained amount or the set value of the attained amount is the same in the case the subject is the energy or voltage.

A further characteristic of the present invention is to provide a controlling means to control the supplying means to have the supplying amount such as the charging voltage set by the supply setting means greater than the specified attained amount as well as to control the switching means to shut off the supply from the supplying means to the storage means, and to send signals to the discharge starting means. That is, since the switching means is controlled via the signals from the detecting means to detect the storage amount stored in the storage means such as a voltage between terminals, it is characteristic of this invention that charging can be completed in a shortest time to start discharge emission without concern about overcharging the main capacitor.

The structure of the optical information recording medium 18 applicable to this invention is as explained with reference to FIGS. 4A and 4B. For example, on a resin or glass substrate such as PMMA and polycarbonate, thin films of a dielectric layer such as $ZnS-SiO_2$ material, a phase transition recording layer which can reversibly change between the crystal state and the amorphous state such as Ge-Sb-Te system, a reflecting layer comprising metal elements such as Au, Al and Cr or sn alloy thereof are laminated.

An embodiment of the optical information recording medium 18 with the structure further including a resin by spin coating on the above mentioned laminated thin films can be used. Further, resin plates and a glass plate like the substrate can be bonded with an adhesive and used. Further, two sets of recording materials can be bonded using a medium substrate and used. Or by having two recording materials bonded with the film side inside with an adhesive, a structure enabling recording, reproduction and erasure from the both sides can be provided.

An optical information recording medium 1 can be produced by any method as long as the recording medium can record, reproduce and erase. Besides, the shape of an optical information recording medium can be selected optionally such as disk type, card type or film type.

Next an embodiment to achieve the third object of the present invention, namely to reduce the warp and distortion of the medium during the process of forming the protection layer and the initial crystallization process will be explained.

Figure 9:
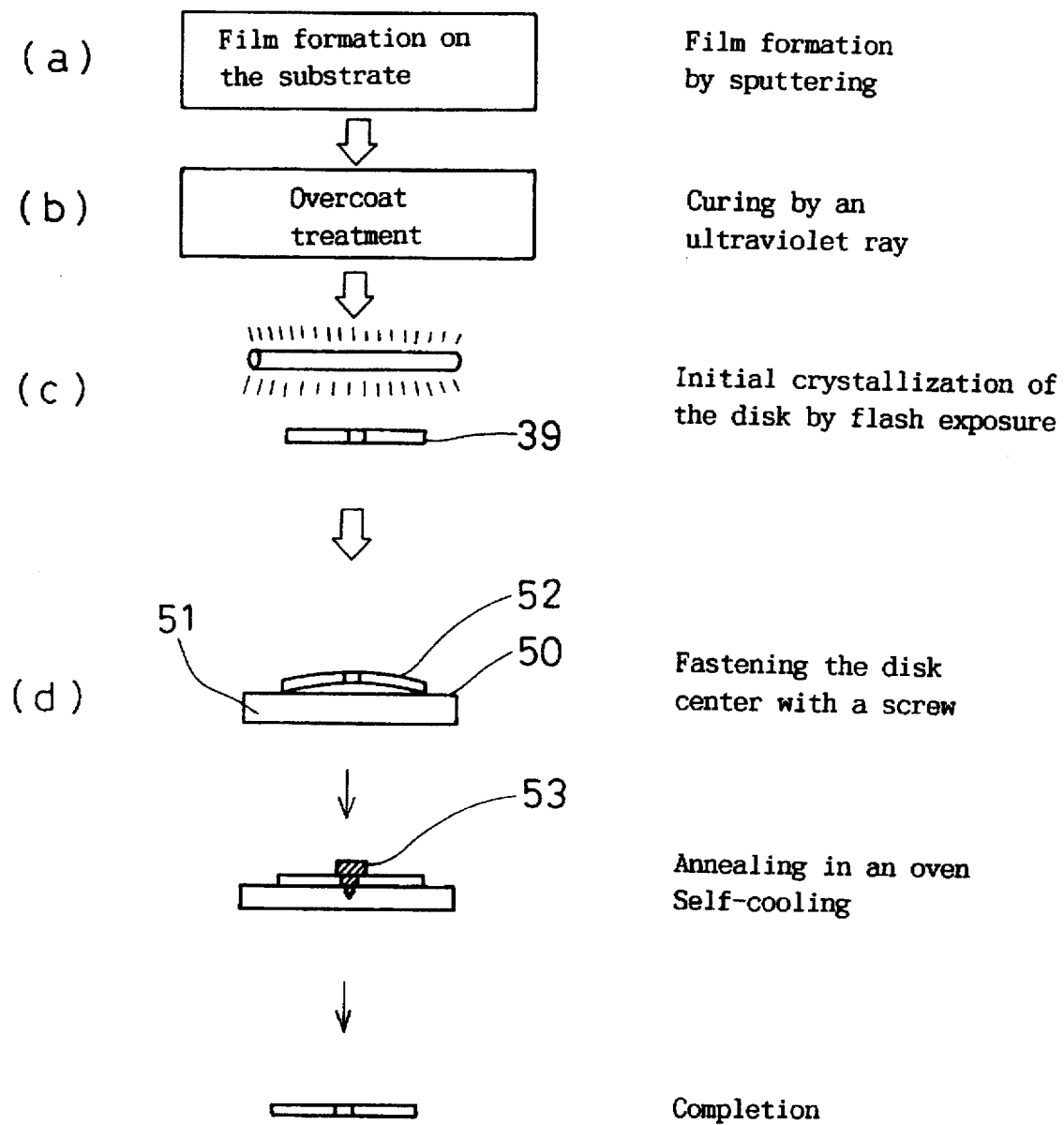
FIG. 9 is a flow chart of an embodiment of production processes for an optical information recording medium of the present invention.

FIG. 9 illustrates the process of producing an optical information recording medium (hereinafter abbreviated optical disk medium) with single side structure as an embodiment of the production process of the optical information recording medium applied to the present invention. Although not illustrated in FIG. 9, the optical disk medium 39 comprises a recording thin film layer exhibiting phase transition and a protection layer on the substrate.

The process (a) is the process to form a recording thin film layer on the substrate. Examples of materials of the above mentioned substrate include organic resin substrates such as those comprising polycarbonate, poly methyl methacrylate (PMMA), and poly olefin, and inorganic substrates such as glass plates and metal plates including copper and aluminum. The surface of the disk substrate is provided with a groove or a pit sequence for guiding light in the shape of concentric circles or a spiral line and a center hole. When an inorganic substrate material including glass plates and metal plates such as copper and aluminum is used, the above mentioned guiding groove or pit sequence is formed by a method such as the 2-P method.

Figure 10A:
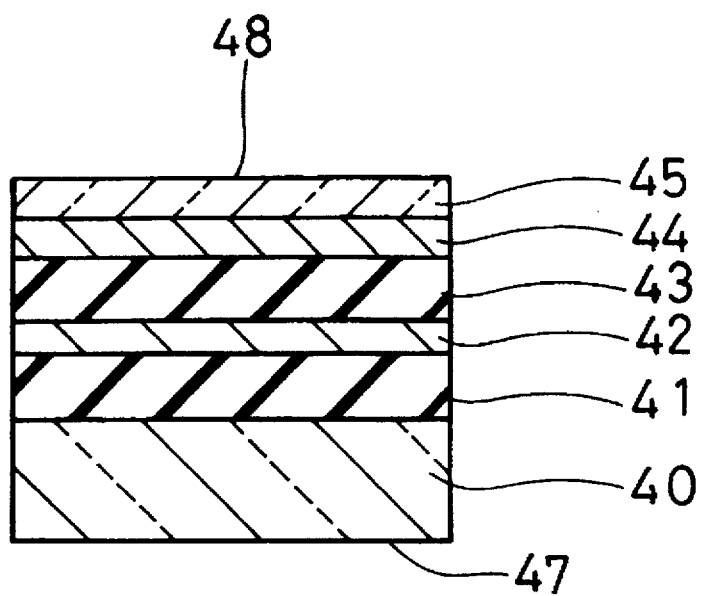

On the substrate, a film forming process (a) is conducted by a method such as sputtering or a vacuum deposition to form a multi layered film having the necessary number of layers. For example, as illustrated in FIG. 10A, a structure with a substrate 40 having four layers, namely, a first dielectric layer 41, a recording thin film layer 42, a second dielectric layer 43 and a reflecting layer 44 laminated thereon is most common. However, each layer may be formed with a plurality of layers of different materials, and the order of formation may be different, namely, the film may be formed in the order of a first reflecting layer 45, a first dielectric layer 41, a recording thin film layer 42, a second dielectric layer 43 and a second reflecting layer 46 successively. Besides, a structure not having either or both of the reflecting layers, or a structure not having either or both of the dielectric layers is also available.

As the material of dielectric layers 41, 43, $ZnS-SiO_2$ mixture film is most common, but oxides such as Zr-O, Ta-O, Ge-O, Ti-O and Al-O, nitrides such as Al-N, Zr-N, Si-N and Ti-N, carbonates such as Si-C and Ti-C, fluorides such as Ca-F and La-F and mixtures thereof are also available.

As the recording thin film layer 42, phase transition recording thin films utilizing phase transition including Ge-Sb-Te system or a system with an element such as Co, Bi, Pd, O, N, Cr, In, Sn and Se added to Ge-Sb-Te system or a system with Ge-Sb-Te system partially substituted by such elements, Sb-Te system, In-Sb-Te system, Ga-Sb system, Ge-Te system, Ag-Sb-In-Te system, Ge-Bi-Te system, Ge-Sn-Te system, Ge-Bi-Te-Se system and Ge-Te-Sn-Au system or a system with additives such as oxide and nitrogen added to such systems can be used.

Examples of materials of the reflecting layer 45 include metals such as Au, Al, Ni, Ag, Ti and Cr, and an alloy using the metals as the base such as Ag-Cr, Al-Cr, Al-Ti, Ni-Cr and Au-Cr.

After the film forming process, the disk medium will be applied with the protection layer formation process (b). In this process, an ultraviolet ray curing resin is applied to the surface by a method such as spin coating, followed by the exposure to an ultraviolet ray for curing to form the protection layer 45.

After the formation of the protection film, the disk medium will be subjected to the initialization process (c). The initialization process can be either a laser method or a flash method. After the initialization process, a disk type medium usually has a warp in a direction projecting in the substrate side 47, namely the substrate side not having the recording layer formed thereon for the previously mentioned two reasons, that is, the contraction caused by the polymerization of the ultraviolet ray curing resin and the contraction of the crystallization of the recording thin film. In this embodiment, a method to reduce the warp is explained.

After the initialization process, the annealing process (d) is conducted. This process is characteristic of this invention. In this embodiment, on a copper plate 51 having a flat surface 50 with a screw hole, an optical disk medium 52 is placed with the projected surface (the substrate surface 47) upward and fastened to the center part of the optical disk with a screw 53, and the disk medium 52 is pressed to the smooth surface 50 to be kept in a condition without warp. Under the condition, the whole apparatus is placed in a dry oven for annealing. After annealing, the whole apparatus is cooled off and after the cooling off and removing the screw, a disk medium with little warp can be obtained.

As methods to correct warp, in addition to the above mentioned method of fastening the optical disk in the center portion to the screw hole with the screw 53, various other methods are available. Examples of them will be explained with reference to concrete examples hereinafter.

(EXAMPLE 1)

On a polycarbonate substrate having a diameter of 130 mm and a thickness of 1.2 mm an $ZnS-SiO_2$ film of 170 nm thickness, $Ge_2Sb_2Te_5$ film of 25 nm thickness, $ZnS-SiO_2$ ($SiO_2$:20 mole %) film of 40 nm thickness, and AlCr (Cr:3 atomic %) film of 80 nm thickness were formed successively by sputtering. An acrylic type ultraviolet ray curing resin was further applied in approximately 20 μm thickness as the outermost layer by spin coating, followed by the mercury lamp irradiation for curing.

Then twelve xenon flash lamps of 35 cm length were juxtaposed to flash simultaneously and the above mentioned disk medium was collectively crystalized. The warp angle was measured in this stage and found to be a rather large figure of 10 milli radian.

Figure 11A:
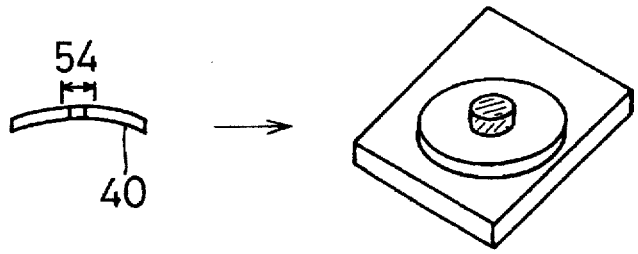

Then the disk substrate 40 was placed on the smooth surface of the copper jig illustrated in FIG. 11A with the substrate surface 47 (projecting surface) upward and the inside perimeter portion 54 fixed, and heated in an oven at 100° C. for one hour.

After self-cooling, the complete curing of the protection layer was observed and the warp angle was measured and found to be a smaller figure of 5 milli radian. Definition of the "warp angle" is described in FIG. 13.

(EXAMPLE 2)

Figure 11B:
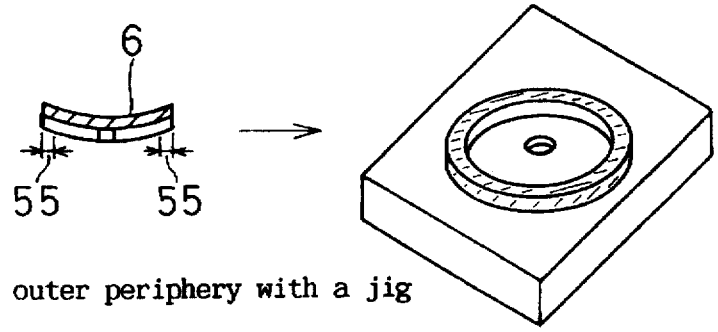
Figure 11C:
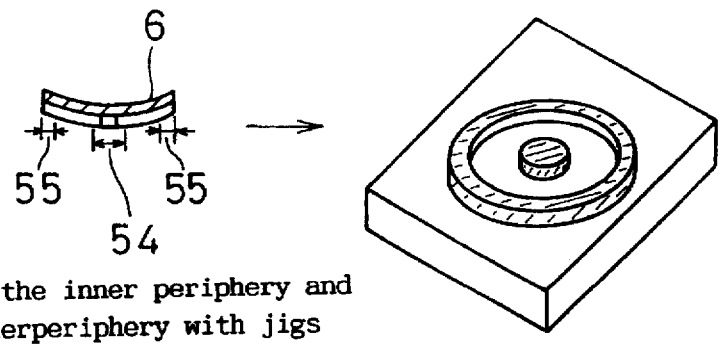

Two media having a warp formed in the same process as Example 1 were annealed with the protection layer surface 48 upward. One medium was fixed at the outside perimeter 55 as illustrated in FIG. 11B, and the other one was fixed at both the outside perimeter 55 and the inside perimeter 54, followed by the annealing treatment.

After self-cooling, the complete curing of the protection layers was observed. However, as to the disk medium with only the outside perimeter 55 fixed had its center portion raised to have random warp in the opposite direction. On the other hand, the disk medium which was annealed with both the inside perimeter 54 and the outside perimeter 55 fixed had a smaller warp angle of 5 milli radian.

That is, it is learned that when annealing is conducted with the substrate surface upward, only the inside perimeter needs to be fixed, but when it is conducted with the protection layer surface 48 upward, both the inside perimeter and the outside perimeter need to be fixed.

(EXAMPLE 3)

Figure 11D:
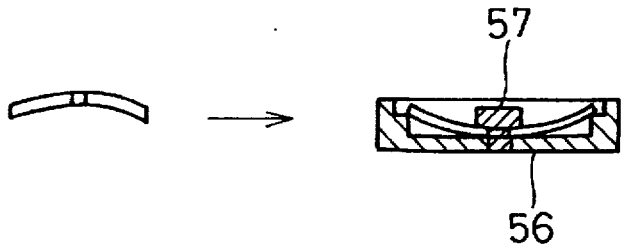

A medium having a warp formed in the same process as Example 1 was placed in the base 56 illustrated in FIG. 11D with the center portion fastened with a screw 57 to have the warp angle of approximately 3 milli radian in the opposite direction, followed by the annealing treatment in the same process as the previous. Example.

After self-cooling, the complete curing of the protection layer was observed and the warp angle was measured and found to be reduced drastically, being smaller than 1 milli radian to the substrate surface.

(EXAMPLE 4)

Figure 12:
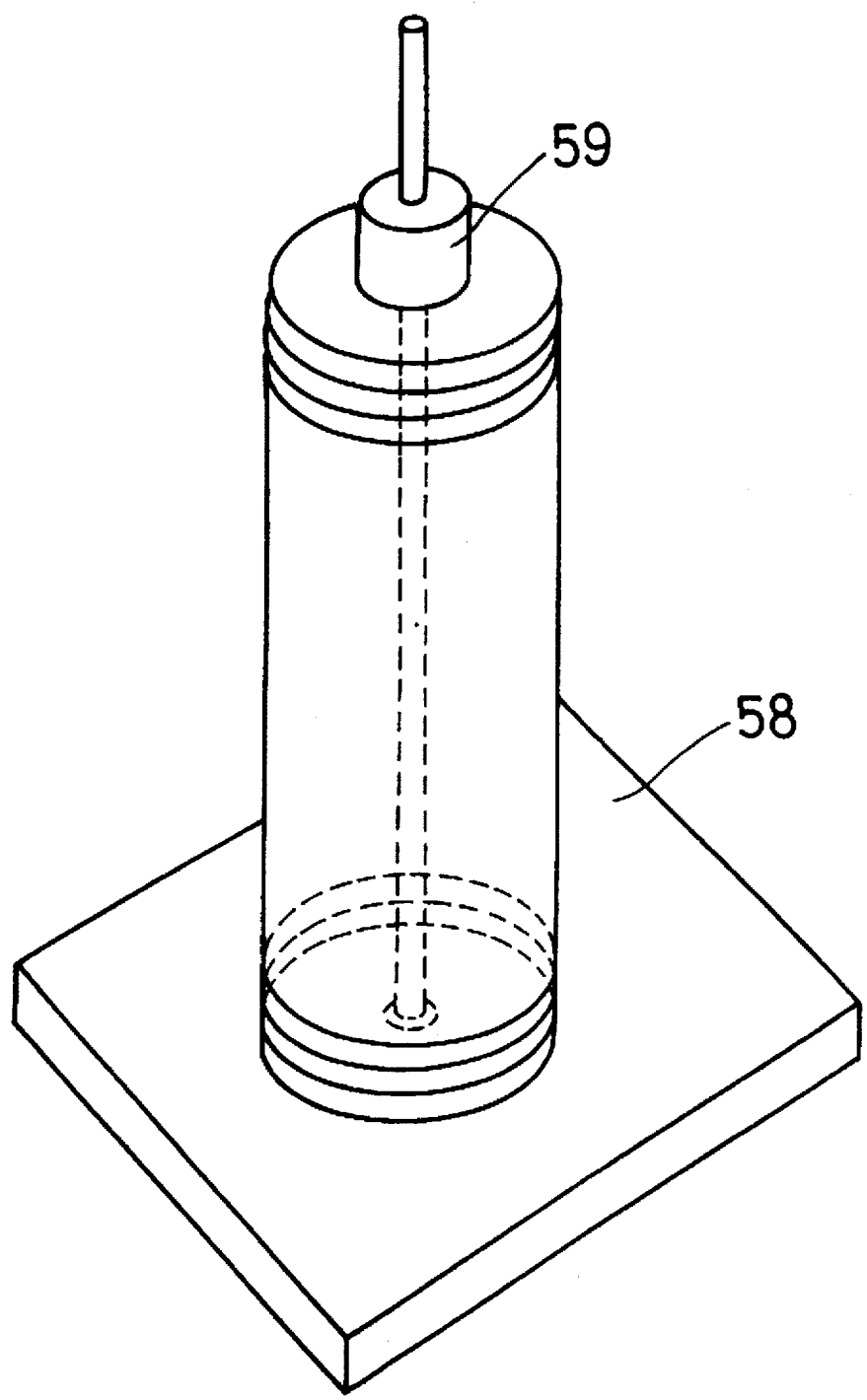
FIG. 12 is a diagram illustrating the process to anneal many disks at one time using a disk fixing jig in a production process of an optical information recording medium of the present invention.

Thirty media having a warp formed in the same process as Example 1 were prepared and superimposed in the same direction and fixed on the base 58 with the weight 59 thereon as illustrated in FIG. 12, and heated in an oven at 100° C. for three hours.

After self-cooling, the complete curing of the protection layers was observed and the warp angle of each medium was measured and found to be smaller than 5 milli radian, (EXAMPLE 5)

The medium of Example 1 was crystallized by the laser method. The disk was rotated at 5 m/s with irradiating by 10 μm pitch the laser beam of the wavelength of 830 nm and output of 1 W and formed to have the peak width at half height of 20 μm to have the whole surface of the medium crystallized. And the warp angle was measured in this stage and found to be 7 milli radian, a smaller value compared with one obtained in the flash method.

Similar to Example 1, the disk substrate was placed with the substrate surface 47 (projecting surface) upward and the inside perimeter portion 54 fixed, and heated in an oven at 100° C. for one hour.

After self-cooling, the complete curing of the protection layer was observed and the warp angle was measured and found to be a smaller value, 5 milli radian.

In comparison of Example 5 and Example 1, it was learned that when both the annealing process and the correcting process are conducted at the same time, a flash initialization method can provide more remarkable effect.

(EXAMPLE 6)

Ten media having a warp formed in the same process as Example 1 were placed on one of three kinds of flat plates, namely, aluminum, alumina and glass, preliminary heated to 100° C. with the substrate surface 40 upward and left for 30 minutes followed by self-cooling.

The complete curing of the protection layers was observed and the warp angles after annealing were measured and found to be in the range of 5 to 7 milli radian regardless of the kind of the flat plate.

(EXAMPLE 7)

In the same process as Example 1, the annealing process was conducted with the annealing temperature in the range of 60° to 120° C. by 10° C. order. As a result, it was learned that a higher annealing temperature provides a better correction effect but if it exceeds 110° C., since polycarbonate was used as the material of the substrate, abnormal shape change of pre-groove was observed.

Embodiments with s substrate using polycarbonate having a low heat resistance as the material were explained in all of the above mentioned Examples. These embodiments can be achieved with a substrate material having high heat resistance such as inorganic materials including glass. In this case, the conditions of curing of the protection layer and the warp before and after the annealing treatment were almost the same as above mentioned Examples but no abnormality of the groove shape was not observed, even when the annealing treatment temperature was 110° C. or higher. That is, the annealing treatment effect was sufficiently provided, and the higher temperature treatment contributed to shortening the treating time.

Although all of the above mentioned Examples dealt with embodiments comprising a dielectric layer, the production process of the present invention is effective regardless of the existence or absence of the dielectric layer.

Further, since the production process of the present invention is to strengthen the credibility of an optical information recording medium by completely curing the protection layer as well as to reduce the warp and distortion inevitably generated in the formation process and/or the initial crystallization process of the recording thin film layer and the protection layer, it is natural that the effect of the invention can be achieved regardless of the materials of the recording thin film layer, the dielectric layer and the substrate.

Next another embodiment of the third object of the present invention, namely to reduce the warp or distortion of the medium in the process formation or the initial crystallization process of the protection layer will be explained.

In this embodiment, a plurality of disk media were prepared in the following process: on a polycarbonate substrate having a diameter of 130 mm and a thickness of 1.2 mm, a $ZnS-SiO_2$ film of 170 nm thickness as the lower coating dielectric layer, a $Ge_2Sb_2Te_5$ film of 25 nm thickness as the recording thin film layer, a $ZnS-SiO_2$ ($SiO_2$:20 mole %) film of 40 nm thickness as the upper coating dielectric layer and a AlCr (Cr:3 atomic %) film of 80 nm thickness as the reflecting layer were formed successively by sputtering. An acrylic type ultraviolet ray curing resin was applied in approximately 20 μm thickness as the uppermost layer by spin coating. With the disk media, the following comparative experiments were conducted.

Figure 14:
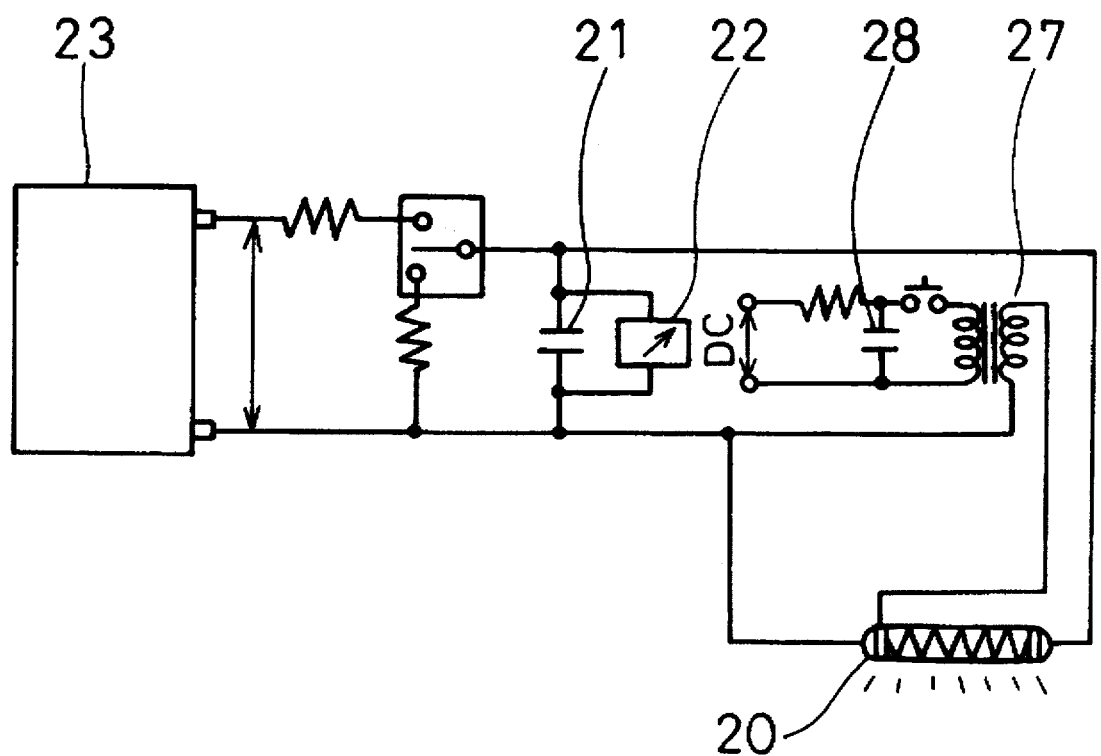
FIG. 14 is a circuit diagram illustrating an embodiment of discharge circuit used in the flash initialization in the production process of an optical information recording medium in the present invention.

A disk medium A was subjected to the mercury lamp irradiation without applying the correction force for curing the ultraviolet ray curing resin followed by the initialization in the flash method. The discharge circuit illustrated in FIG. 14 was used for the flash initialization and by flashing the xenon discharge tube, light irradiation was conducted.

Figure 15:
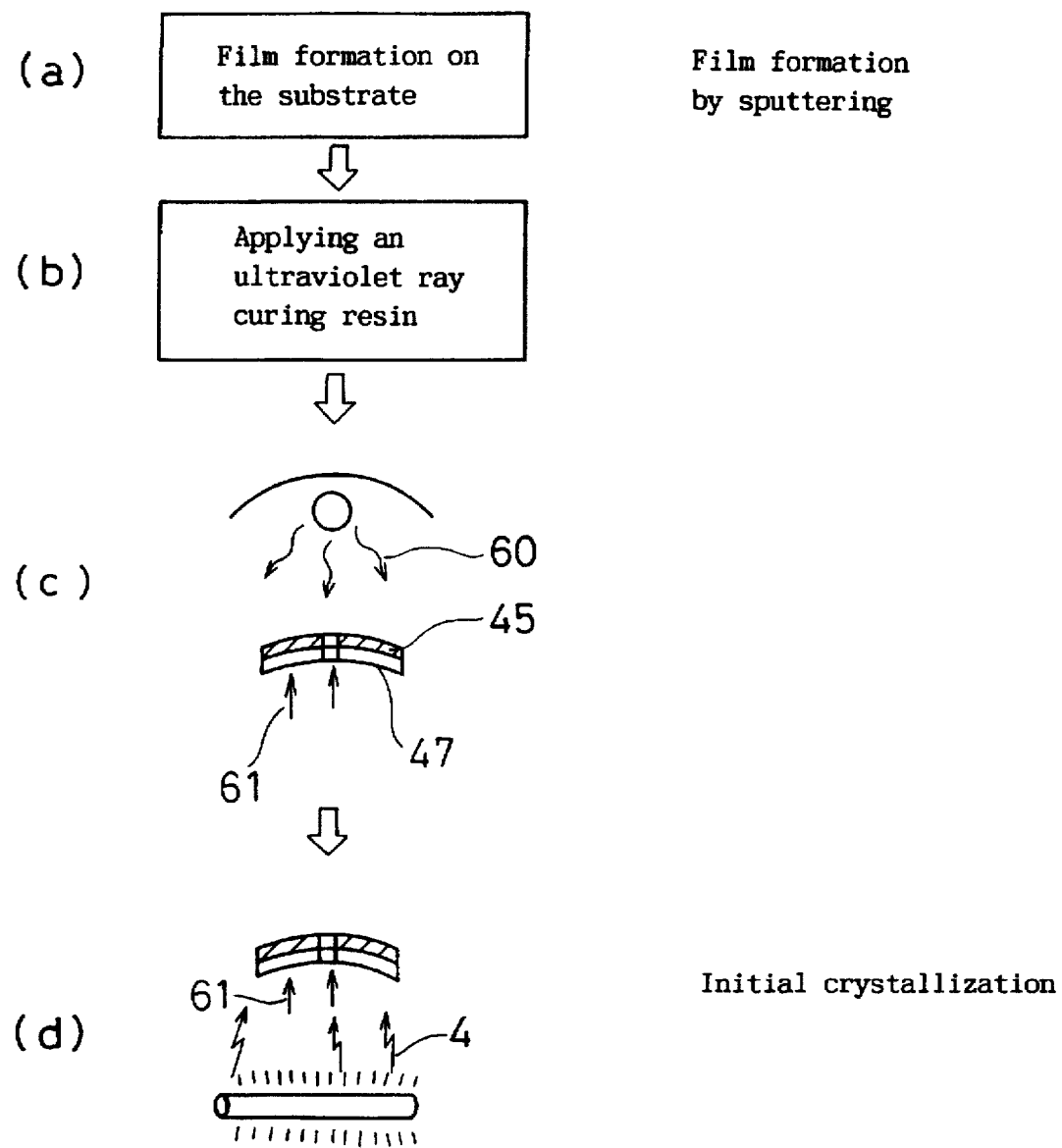
FIG. 15 is an flow chart of an embodiment of flash irradiation with corrective treatment so that the substrate surface forms a concave shape in the production process of an optical information recording medium of the present invention.

A disk medium B was subjected to the ultraviolet ray irradiation for curing the ultraviolet ray curing resin layer followed by the flash initialization with the corrective force 61 applied to have the substrate surface 47 having the concave shape as illustrated in FIG. 15.

A disk medium C was subjected to the ultraviolet ray 60 irradiation followed by the annealing process of treatment in an oven at 100° C. for one hour with the corrective force 61 similar to the case of the disk medium B applied. Then, after removing the correction force 61, the flashing initialization was conducted.

A disk medium D was subjected to the ultraviolet ray 60 irradiation followed by the annealing and flashing initialization with the corrective force 61 similar to the case of the disk medium C applied.

A disk medium E was subjected to the mercury lamp irradiation with the corrective force 61 applied for curing the ultraviolet ray curing resin. Then without having the annealing treatment, the flash initialization was conducted after removing the above mentioned corrective force 61.

A disk medium F was subjected to the ultraviolet ray irradiation similarly to the case of the disk medium B followed by the annealing with the corrective force 61 applied in an oven at 100° C. for one hour and after removing the corrective force 61, the flash initialization was conducted.

A disk medium G was subjected to the ultraviolet ray irradiation and the flash initialization with the corrective force 61 applied.

Figure 13:
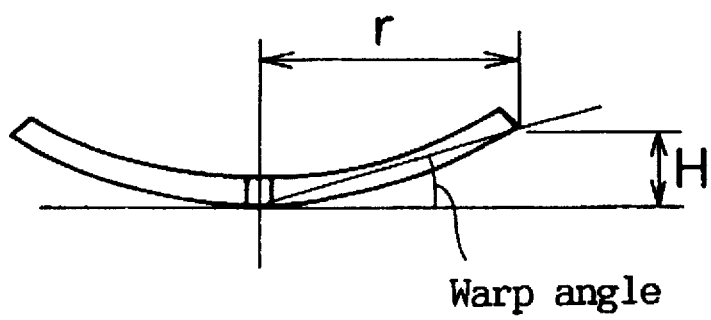
FIG. 13 is a diagram illustrating the method of measuring the warp angle used in the present invention.

The warp amounts of each disk medium A to G were compared and evaluated from the warp angle illustrated in FIG. 13. The results are shown in Table 4. In the table, "warped amount" denotes the angle obtained by applying the correction force and described by the warp angle and "warp" denotes a virtual measurement result after finishing each process. "No" in the table denotes the process was simplified or omitted. Further, the mark "+" denotes the substrate surface formed convex and the mark "−" denotes the substrate surface formed concave. Some of the embodiments were conducted plural times having different applied forces to adjust the warp angle. In consideration of the production convenience, the maximum amount of the warped amount was set to be 5 milli radian. However, an amount of 7 milli radian or smaller is acceptable.

TABLE 4

Comparison of different production process and warp amount
(Unit : milli radian)

|  | ultraviolet ray irradiation | | annealing | | initialization | |
|---|---|---|---|---|---|---|
|  | warp | | | | | |
|  | warped amount *1 | amount after irradiation | warped amount *2 | warp amount after annealing | warped amount *3 | warp amount after initialization |
| A | No | −0.5 | No | same | No | +10 |
| B | No | −0.5 | No | same | −5 | +8 |
| C1 | No | −0.5 | −5 | −5 | No | −3 |
| C2 | No | −0.5 | −3 | −3 | No | −1 |
| D1 | No | −0.5 | −5 | −5 | −5 | −4 |
| D2 | No | −0.5 | −2 | −2 | −2 | −1 |
| E | −5 | −5 | No | same | No | +8 |
| F | −5 | −5 | −5 | −5 | No | −2 |
|  | −3 | −3 | −3 | −3 | No | 0 |
| G | −5 | −5 | −5 | −5 | −5 | −4 |
|  | −2 | −2 | −2 | −2 | −2 | −1 |

Note: *1 "No" denotes "without correcting force", *2 "No" denotes "without annealing, *3 "No" denotes "without correcting force", respectively.

From the results described in Table 4, it was learned that in the cases A, B and E without annealing process after curing the ultraviolet ray curing resin, regardless of the conditions of the ultraviolet ray irradiation, a large warp with the ultraviolet ray curing resin layer having a concave shape after initialization was observed.

On the other hand, in the cases C and D without applying correction force at the time of ultraviolet ray irradiation, and applying the force to have the substrate surface concave at the time of annealing, the case F with applying correction force during the ultraviolet ray irradiation process and the annealing process, and the case G with applying correction force through the ultraviolet ray irradiation process, the annealing process, and the initialization process, the warp amount became very small and it was proved that conducting annealing treatment with correction force is highly effective.

The above mentioned disks were evaluated with respect to the servo characteristics by the deck. The disks were driven with the number of revolution of 1800 rpm. In the conditions with a laser wavelength of 780 nm and numeral aperture of the objective lens of of 0.55, results of disks C, D, F, and G were good with respect to both focusing and tracking while results of disks A, B and E were poor with respect to focusing.

Figure 16:
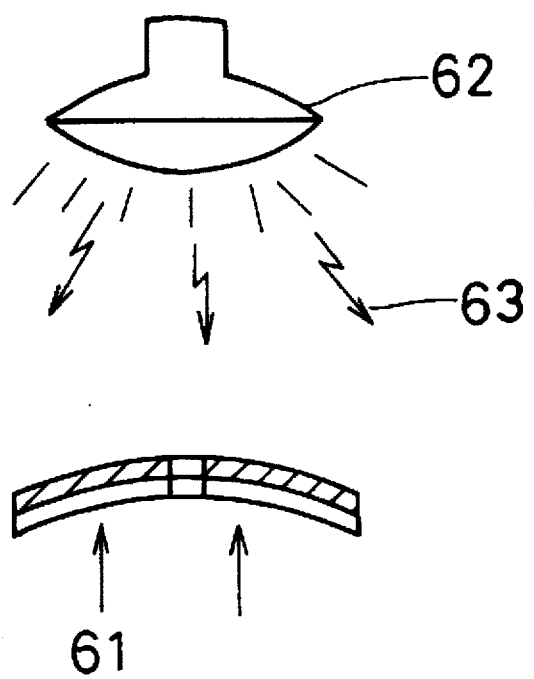
FIG. 16 is a diagram of an embodiment of annealing process using an infrared lamp in the production process of an optical information recording medium of the present invention.

As to the annealing method, in addition to the method of placing the whole disk medium into an oven, a method of heating the disk with the infrared light 63 by means of the infrared lamp 62 as illustrated in FIG. 16 is also available and it is convenient with respect to providing high speed heating. Annealing with infrared lamp 62 was conducted with the disks C, D, F and G of the above mentioned embodiment to show the same result.

Figure 10B:
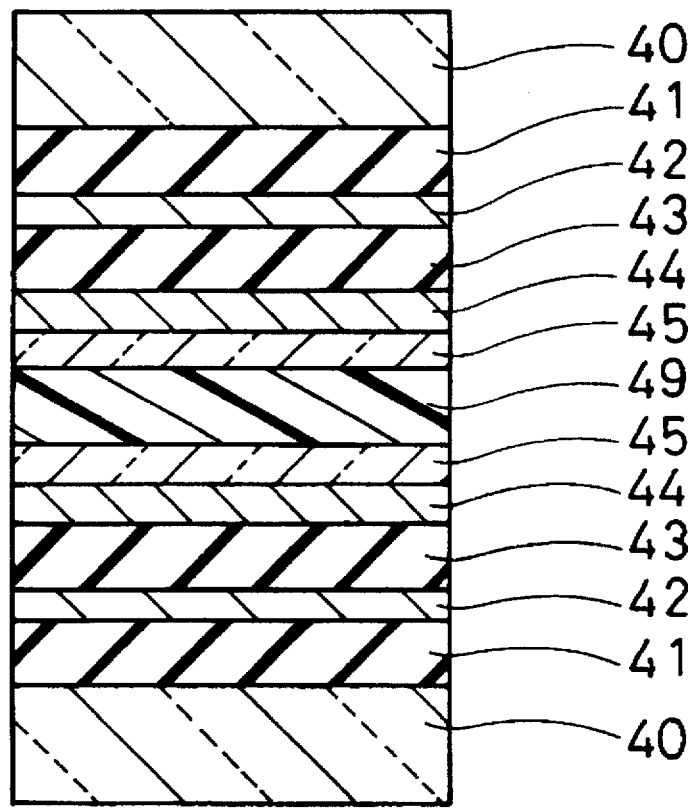

Since an important point of this invention is to provide a production process applying a correction force to the direction to correct the warp of a disk in at least the ultraviolet ray curing process and the initialization process of the protection layer, any phase transition optical information recording medium which needs the initial crystallization explained in FIG. 4 and FIG. 10 can be used.

Next another embodiment of the fourth object of the present invention, namely examples of media with double sides structure produced in a reduced number of production steps and the production process will be explained.

Figure 17:
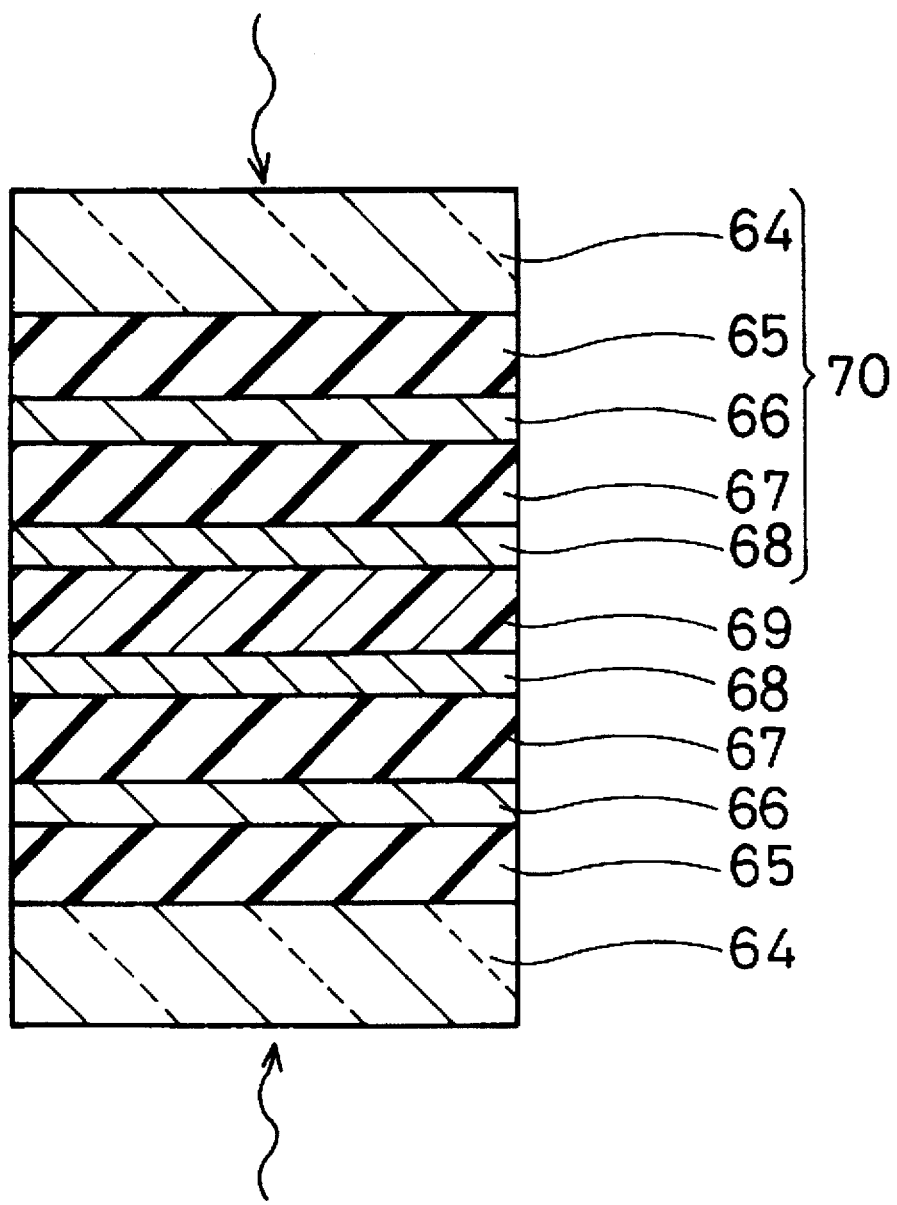
FIG. 17 is a section view of an embodiment of a double sides structure optical information recording medium formed with an ultraviolet ray curing resin as an adhesion layer.

FIG. 17 is a section view to show an embodiment of an optical information recording medium with double sides structure of the present invention. In this embodiment, on a polycarbonate with 1.2 mm thickness as the transparent susbstrate 64, a ZnS-SiO$_2$ film with 90 nm thickness as the first dielectric layer 65, a Ge$_2$Sb$_2$Te$_5$ alloy thin film layer with 30 nm thickness as the recording thin film layer 66, a ZnS-SiO$_2$ film with 154 nm thickness as the second dielectric layer and an Au thin film layer with 10 nm thickness as the metal reflecting layer 68 were laminated by sputtering to form the optical information recording material 70 with single side structure. Two pieces of the optical information recording materials 70 were butted to each other with the film sides inside and affixed with a resin containing the ultraviolet ray sensitive component (hereinafter abbreviated "ultraviolet ray curing resin") to form the adhesive layer 69.

The transmissivity of the above mentioned optical information recording material with single side structure was about 5% in the vicinity of the wavelength of the mercury lamp (250 to 30 nm) used in the curing treatment of the ultraviolet ray curing resin.

As to the material of the transparent substrate 64, in addition to the above mentioned polycarbonate, materials such as poly methyl methacrylate (PMMA) and glass can be used. As to the material of the first dielectric layer and the second dielectric layer, in addition to the above mentioned ZnS-SiO$_2$, material such as oxide dielectrics such as SiO$_2$ and Ta$_2$O$_5$, nitrides such as SiN and AlN can be used. As to the material of the recording thin film layer 66, phase transition materials of In-Sb-Te system can be used. There is no limitation for materials of the optical information recording media with double sides structure of the present invention.

Figure 18:
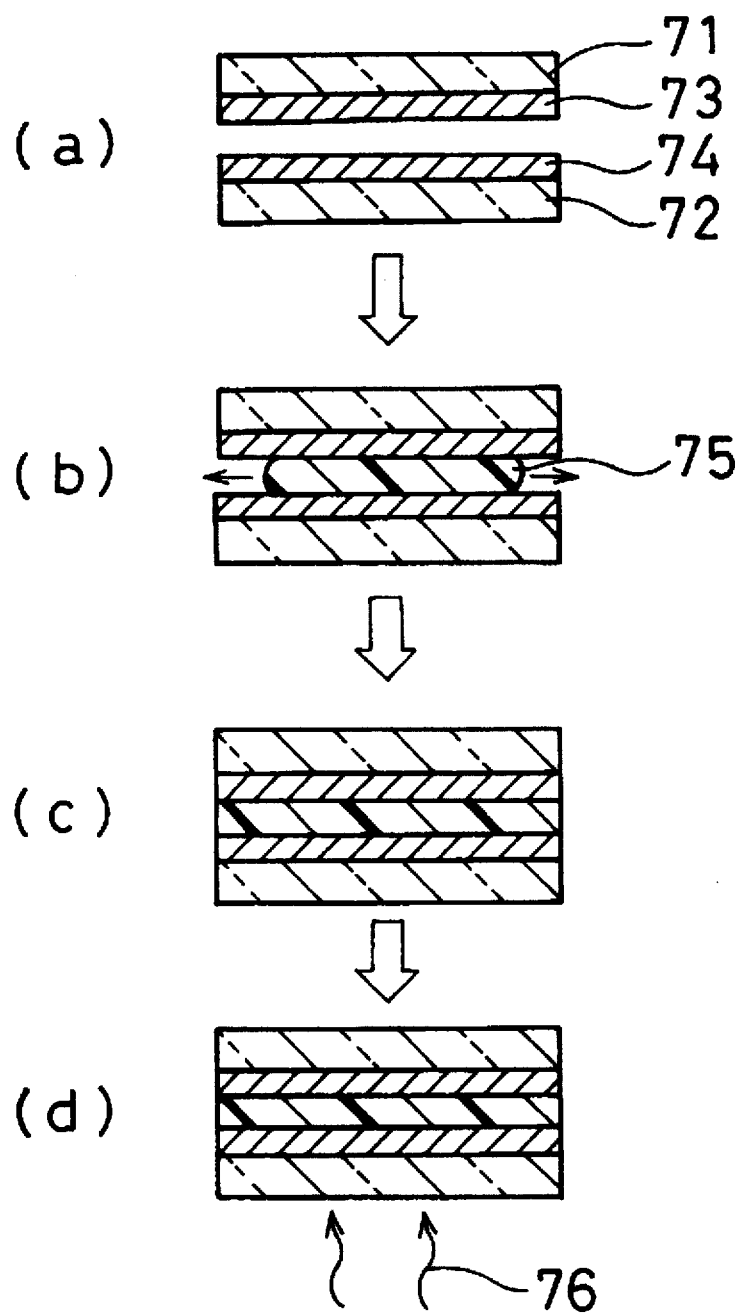
FIG. 18 is a flow chart of an embodiment of a production process for a double sides structure optical information recording medium of the present invention.

FIG. 18 is a flow chart of the affixing process of the optical information recording medium with double sides structure of an embodiment of the present invention. On the transparent substrates 71, 72 of polycarbonate, thin films 73, 74 formed in a multi-layer to form a recording layer and the optical information recording material 70 is comprised.

First, as illustrated in the process (a), the substrate 71 and the substrate 72 are opposed with the surfaces on which the thin film 73 and the thin film 74 are formed inside. The space between the thin film 73 and the thin film 74 can be provided optionally but about 3 mm would be appropriate. Second, as illustrated in the process (b), the ultraviolet ray curing resin 75 is filled in the space provided. After filling, the substrate 71 and the substrate 72 are put closely. Then as illustrated in the process (c), the ultraviolet ray curing resin 75 extends to the whole surface of the thin films 73, 74. In addition to the above mentioned method of putting the substrates closely, if the substrates 71 and 72 are rotated, even application of the ultraviolet ray curing resin can be facilitated, and thus it is preferable. After applying the ultraviolet ray curing resin 75 evenly as illustrated in the process (c), the ultraviolet ray 76 is irradiated from the substrate 72 side and about 5% of the irradiated ultraviolet ray 76 reach the ultraviolet ray curing resin 75 to cure the ultraviolet ray curing resin as illustrated in the process (d). By the above mentioned processes, the substrate 71 and the substrate 72 are unified to produce the optical information recording medium with double sides structure.

Although an example of irradiating the ultraviolet ray from one side (substrate 72 side) of the optical information recording medium, the irradiation may be conducted from both of transparent substrate 71, 72 sides. In this case, since the curing of the ultraviolet ray curing resin 75 is facilitated from both sides, it allows affixing the optical information recording medium with double sides structure in an even shorter time.

The ultraviolet ray transmissivity of the optical information recording medium of the optical information recording medium of the present invention depends upon the material and the film thickness of the metal reflecting layer either in the case with the structure having only the recording thin film layer and the metal reflecting layer, or in the case with the structure having the recording layer sandwiched by two dielectric layers one of which having a metal reflecting layer as illustrated in FIG. 17. Therefore by controlling mainly the material of the metal reflecting layer and the film formation of the reflecting layer, the ultraviolet ray transmissivity of the sensitive wavelength region, an important point in the present invention, can be set.

As to the materials of the metal reflecting layer, pure metal materials including Al, Cr Ag, Cu, Ni and Au, and alloy material containing other metal material can be used. In order to achieve the purpose of the present invention, any material with approximately less than 20 nm to 50 nm thickness can be used. In particular, Au or an alloy containing Au as the principal component, namely $Au_{100-x}M_x$ (100>x≧0, M:metal element comprising the alloy) is preferable with respect to both reflecting ratio and the transmissivity of the ultraviolet ray.

As mentioned above, although the material and/or the film thickness of the metal reflecting layer is the main element, there is some contribution of the film thickness of the substrate and the film thickness of the dielectric layer, therefore sometimes it may be necessary to adjust the film thickness of the layers according to the materials used. In general, if the transmissivity is 3% or more in the ultraviolet ray wavelength region is sufficient.

However, in the case of applying the change of optical characteristics from the amorphous phase to the crystal phase of the recording thin film layer, since the recording thin film layer is in the amorphous phase in general at the time of forming the recording thin film layer, the ultraviolet ray transmissivity of the recording thin film layer in the amorphous state needs to be approximately 3% or more in advance.

Then the transmissivity and the curing degree of the ultraviolet ray curing resin of the optical information recording medium with double sides structure affixed by the the above mentioned process were evaluated. The ultraviolet ray transmissivity of the optical information recording media with the double sides structure were prepared 0%, 1%, 2%, 3%, and 5% respectively by changing the film structure of the thin films 73 and 74.

The structure of the thin films 73, 74 of the optical information recording medium with double sides structure having 0% transmissivity was formed by applying a ZnS-SiO$_2$ (SiO$_2$:20 mole %) film of 70 nm thickness, a Ge$_2$Sb$_2$Te$_5$ alloy thin film with 25 nm thickness, a ZnS-SiO$_2$ (SiO$_2$:20 mole %) film with 45 nm thickness and an AlCr (Cr:3 atomic %) of 90 nm thickness on transparent substrates 71, 72 respectively.

The structures of the thin films 73, 74 of the optical information recording media with double sides structure having 1%, 2%, 3% and 5% transmissivity were formed by applying a ZnS-SiO$_2$ (SiO$_2$:20 mole %) film of 92 nm thickness, a Ge$_2$Sb$_2$Te$_5$ alloy thin film with about 20–40 nm thickness, a ZnS-SiO$_2$ (SiO$_2$:20 mole %) film with 160 nm thickness and an Au film of about 5– 30 nm thickness on transparent substrates 71, 72 respectively. And by adjusting the film thicknesses of the alloy thin film and the Au reflecting layer, transmissivities were adjusted. Results are shown in Table 5.

TABLE 5

| Ultraviolet ray transmissivity and curing characteristics by ultraviolet ray irradiation of media | | |
|---|---|---|
| Transmissivity | Curing characteristics | Results |
| 0% | not cured | x |
| 1% | partially cured (>10 min) | x |
| 2% | cured about 10 min | △ |
| 3% | cured 4–5 min (about 2 min in both sides irradiation) | ○ |
| 5% | cured within 1 min | ◉ |

As shown in Table 5, although ultraviolet ray irradiation was conducted to affix the optical information recording medium with double sides structure with 0% transmissivity, the ultraviolet ray curing resin was not cured.

Then ultraviolet ray irradiation was conducted to affix the optical information recording medium with double sides structure with 1% transmissivity and only a part of the ultraviolet ray curing resin was cured. Even after 10 minute continuous ultraviolet ray irradiation the curing was not facilitated and remained insufficient. Also the ultraviolet ray irradiation was conducted to affix the optical information recording medium with double sides structure with 2% transmissivity although the ultraviolet ray curing resin was cured it took about 10 minutes irradiation time. The curing time is not satisfactory since the current production of the optical information recording media requires through-put time of about 2–3 minutes.

On the other hand, ultraviolet ray irradiation was conducted to affix the optical information recording medium with double sides structure with 3% transmissivity and the ultraviolet ray curing resin was cured in about 4–5 minutes. Further, with the ultraviolet ray irradiation from both sides of the optical information recording medium with double sides structure, the ultraviolet ray curing resin was cured in about 2 minutes.

Finally, ultraviolet ray irradiation was conducted to affix the optical information recording medium with double sides structure with 5% transmissivity from one side and the ultraviolet ray curing resin was cured within only 1 minutes.

From the above mentioned results, the recommendable figure of the ultraviolet ray transmissivity of the thin films 73, 74 in affixing the optical information recording medium with double sides structure with an ultraviolet ray curing resin is 3% or more with respect to the curing degree and the throught-put time.

The affixing strength of the optical information recording media with double sides structure so produced were evaluated. The evaluation was conducted by drop test and in the environment of high temperature and high humidity. The drop test was conducted by inserting an optical information recording medium with double sides structure in a cartridge used in recording and reproduction of the recording medium and dropping the cartridge from 75 cm above the concrete surface for six times. As a result, the optical information recording media with 3% transmissivity and 5% transmissivity had no damage such as partial peel off of the affixed part. The medium with 2% transmissivity had no damage until the fourth time but suffered a partial peel off at the fifth time.

Further, optical information recording media with double sides structure were left in the atmosphere of 80° C., 80% RH for 300 hours and examined. The optical information recording media with both sides structure having 3% transmissivity and 5% transmissivity had no peeling off of the affixed part or crack. The medium with 2% transmissivity had no damage until after 100 hours but suffered a partial peel off after 300 hours.

In Table 5, the mark ⊚ denotes excellent characteristics, the mark ○ denotes good characteristics, and the mark × denotes insufficient for practical use, and the mark △ denotes the characteristics therebetween and may be applied for practical use according to conditions.

Next the produced optical information recording media with double sides structure were initialized. Since in the phase transition optical information recording media between the amorphous phase and the crystal phase in general recording is conducted from the crystal phase to the amorphous phase, as a premise of recording, the recording thin film needs to be converted to the crystal phase in advance, and this procedure is called initialization.

As the initialization method, two methods already explained were used. That is, a consecutive treatment method using a laser beam disclosed in the official gazette of the Japanese Patent Application Laid Open No. 106031/1985 was conducted. By using a laser of an output far larger than that of the laser diode used in recording and reproduction, a light spot of several tens to several hundreds μm width was formed. By irradiating the light spot with a medium passing at a constant rate, many tracks can be crystallized at one time.

Also a flash light method to crystallize the whole portion of the disk surface collective in a short time by means of the xenon lamp disclosed in the official gazette of the Japanese Patent Application Laid Open No. 250533/1987 was conducted.

After initialization by the above mentioned two kinds of processes, optical information recording media with double sides structure affixed with a hot melt adhesive conventionally used, and optical information recording media with double sides structure affixed with an ultraviolet ray curing resin illustrated in FIG. 17 were compared with respect to the state of the initialization.

Disks initialized by a laser beam either affixed with an ultraviolet ray curing resin or a hot melt adhesive were initialized preferably without suffering damages such as crack, flaw or peeling off.

A disk affixed with a hot melt adhesive and initialized by a flash light had a slight peeling off, wrinkle and crack in several portions but an optical information recording medium with both sides structure of the present invention illustrated in FIG. 17 had no damages such as flaw, crack and peeling off.

Then the optical information recording medium with double sides structure illustrated in FIG. 17 after initialization was put in a recording and reproduction apparatus for recording and reproduction evaluation. The disk was driven at the linear velocity of 27 m/s, and a laser of 780 nm wavelength (numeral aperture: NA=0.55) was binarily modulated with the peak power of 24 mW and the bias power of 12 mW and a signal with the recording frequency f1=18 MHz and a signal with the recording frequency f2=6.75 MHz were recorded by overwriting alternately.

The carrier and noise ratio (hereinafter abbreviated "C/N") and the erasure ratio of f1 were measured and it was learned that the C/N was 52 dB and the erasure ratio was 26 dB and thus the initialization was conducted successfully. And further overwriting recording was conducted repeatedly to find the initial signal quality to be maintained without deterioration of the C/N or the erasure ratio.

As mentioned above, the present invention provides optical information recording media with double sides structure produced in a short time with fewer production steps by applying an ultraviolet ray curing resin as the material of the adhesion layer, having the recording medium with a multi-layered structure, selecting the film thickness of each layer to provide a transmissivity of about 3% or more in the sensitive light wavelength of the ultraviolet ray curing resin and irradiating an ultraviolet ray.

Although the case using two pieces of the same optical information recording media affixed together was explained in the above mentioned embodiment, since the essence of the present invention can be achieved as long as at least one of the optical information recording materials has an ultraviolet ray transmissivity of about 3% or more, one of the optical information recording materials of an optical information recording media with double sides structure may be one only for reproduction such as a CD, LD and a CD-ROM. Further, one of optical information recording materials may comprise only a recording thin film layer and a metal reflecting layer. Embodiments having different materials and/or film thicknesses of each layer of the two optical information recording materials, namely, materials dielectric layer, recording thin film layer, and metal reflecting layer may be used as well.

Resins at least containing an ultraviolet ray sensitive curing component may be used to affix optical information recording materials in the present invention. That is, effects of the present invention can be provided if an ultraviolet ray sensitive curing component is mixed in a conventional hot melt adhesive and used.

Although the present invention has been explained with reference to Examples, it is naturally understood that the present invention is not limited to the embodiments described herein and can be applied in any other embodiments as long as objects of the present invention can be achieved.

What is claimed is:

1. An initialization process for an optical information recording medium, applied to an optical information recording medium which comprises a recording thin film layer which exhibits a phase transition between the crystal phase and the amorphous phase formed on a substrate, the initializing comprising irradiating a flash light to initialize the recording thin film layer, comprising the steps of;
   supporting the optical information recording medium at a specified position;
   charging electric energy in a storage circuit portion to supply to a flash light source;
   starting emission by triggering the flash light source; and
   starting operation of a shutoff circuit portion connected to the flash light source after having the emission for a specified time period to terminate the discharge instantly to drop the emission power to virtually a zero level.

2. The initialization process of an optical information recording medium according to claim 1, wherein the maximum discharge time is 2 milli seconds.

3. The initialization process of an optical information recording medium according to claim 1, wherein the main component of the recording thin film layer is a Ge-Sb-Te alloy.

4. An initialization apparatus for an optical information recording medium, for irradiating a flash light to an optical information recording medium comprising a recording thin film layer exhibiting a phase transition between the crystal phase and the amorphous phase on a substrate, to initialize the recording thin film layer, comprising;
   a support to support the optical information recording medium;
   a light source to discharge a flash light by electric discharge;
   a storage circuit portion to store electric energy to supply to the light source;
   a trigger circuit portion to start the discharge of the light source; and
   a shutoff circuit portion to terminate the discharge instantly after having the emission for a specified time period to drop the emission power from a specified power level to virtually a zero level.

5. An initialization apparatus for an optical information recording medium, for irradiating a flash light to an optical information recording medium comprising a recording thin film layer which exhibits a phase transition between the crystal phase and the amorphous phase on a substrate, to initialize a the recording thin film layer, comprising;
   a supporting means to support the optical information recording medium;
   a light source to irradiate a flash light by electric discharge;
   a storage means to store energy to supply to the light source;
   a discharge starting means to commence the discharge of the light source;
   a storage amount detecting means to detect the energy amount stored in the storage means;
   a supply amount setting means to set the amount to supply energy from the supply means; and
   a controlling means to control the supply amount set by the supply amount setting means to be greater than the attained amount or the specified amount of the specified attained amount of the energy in the storage means according to the amount detected by the storage amount detecting means and to shut off the energy supply from the supply means to the storage means by a switch when the energy amount of the storage means reaches the specified amount to start flashing the light source by the discharge starting means.

6. The initialization apparatus for an optical information recording medium according to claim 5, wherein the energy supply amount of the supply means and the energy storage amount of the storage means are detected by means of the voltage value and the voltage value of the supply means is greater than the voltage value of the storage means after completing storing.

7. The initialization apparatus for an optical information recording medium according to claim 5, wherein the energy supply amount of the supply means and the energy storage amount of the storage means are detected by means of the voltage value and the difference between the voltage value of the supply means and the attained voltage value of the storage means is constant.

8. A production process for an optical information recording medium to produce an optical information recording medium comprising a multilayered recording layer including a recording thin film layer which exhibits a phase transition between the crystal phase and the amorphous phase on a substrate and a protection layer of a curing film including an ultraviolet ray curing resin as the outermost layer, comprising the steps of;
   an ultraviolet ray irradiating process to irradiate an ultraviolet ray while applying a corrective force to the recording layer and the substrate surface opposing to the substrate having the protection layer after forming the ultraviolet ray curing resin film; and
   an initial crystallization process conducted after the ultraviolet ray irradiation process.

9. The production process for an optical information recording medium according to claim 8, wherein an annealing process to heat the optical information recording medium is further conducted between the ultraviolet ray irradiation process and the initialization process.

10. The production process for an optical information recording medium according to claim 9, wherein the annealing process is conducted with the corrective force applied.

11. The production process for an optical information recording medium according to claim 9 or 10, wherein the heat source of the annealing process is an infrared lamp irradiation.

12. The production process for an optical information recording medium according to claim 8, wherein the initialization process is conducted with the corrective force applied.

13. The production process of an optical information recording medium according to claim 8, 9 or 12, wherein the initialization process is conducted by the flash irradiation.

14. The production process for an optical information recording medium according to claim 8, wherein the ultraviolet ray is irradiated with the optical information recording medium positioned in an orientation to correct a warp by its own weight.

15. A production process for an optical information recording medium to produce an optical information recording medium comprising a multi-layered recording layer including a recording thin film layer which exhibits a phase transition between the crystal phase and the amorphous phase formed on the substrate and a protection layer of a curing film including an ultraviolet ray curing resin as the outermost layer, further comprising a step of annealing to completely cure the protection layer after the initial crystallization process.

16. The production process for an optical information recording medium according to claim 15, wherein the recording thin film layer is an alloy thin film comprising Ge-Sb-Te as the main component.

17. The production process for an optical information recording medium according to claim 15, wherein a treatment to correct the optical information recording medium to eliminate a warp or a treatment to apply an external force to the direction to eliminate a warp is applied in the annealing process.

18. The production process for an optical information recording medium according to claim 15, wherein an optical information recording medium having a disk shape is placed on a base having a hole with a diameter slightly smaller than the outside diameter of the optical information recording medium so that the outside diameter of the optical information recording medium is supported with the center of the optical information recording medium and the center of the hole superimposed and the convex surface of the optical information recording medium upward and the center portion of the optical information recording medium is loaded or fixed.

19. The production process for an optical information recording medium according to claim 15, wherein the annealing process is conducted with a corrective treatment, with the surface of at least one selected from the group consisting of the substrate surface and the protection layer surface left turned down to a smooth plane.

20. The production process for an optical information recording medium according to claim 15, wherein the annealing process is conducted with a corrective treatment, with at least one selected from the group consisting of the substrate surface, the inner periphery of the protection layer surface and the outer periphery of the protection layer surface is pressed to an object having a smooth plane.

21. The production process for an optical information recording medium according to claim 15, wherein the smooth plane is a plane of an object having a heat resistivity of a temperature higher than that of the annealing process, and the annealing process is conducted with the optical information recording medium placed on the smooth surface of the object which has been heated to a specified temperature.

22. The production process for an optical information recording medium according to claim 15, wherein the annealing process is further conducted with a corrective treatment, with a plurality of optical information recording media having a single side structure piled and applied with a force from both sides.

23. The production process for an optical information recording medium according to claim 15, wherein the temperature of the annealing process is the same as or lower than the temperature at which the phase transition of the recording thin film layer occurs.

24. The production process for an optical information recording medium according to claim 23, wherein the annealing temperature is 100° C. or lower.

25. The production process for an optical information recording medium according to claim 15, wherein the initial crystallization process is conducted by flash exposure.

26. The production process for an optical information recording medium according to claim 15, wherein the optical information recording medium comprises a first dielectric layer, a recording thin film layer, a second dielectric layer and a reflecting layer laminated on the substrate further having the protection layer as the outermost layer.

27. An optical information recording medium comprising two optical information recording materials, each comprising a multi-layered film which comprises a recording thin film layer which exhibits a transition optically detectable by a laser irradiation and a metal reflecting layer on a transparent substrate, affixed together with the multi-layered film opposed to each other by means of a resin containing an element sensitive to an ultraviolet ray to be cured, at least one of the two optical information recording materials having a transmissivity of about 3% or more in the ultraviolet ray sensitive wavelength range of the resin.

28. The optical information recording medium according to claim 27, wherein the metal reflecting layer is an alloy $Au_{100-x}M_x$ (M:metal element, $100>X \geq 0$) comprising Au as the main component.

29. The optical information recording medium according to claim 27, wherein the recording thin film layer utilizes the change of the optical characteristics according to the phase transition between the amorphous phase and the crystal phase, and when the recording thin film layer of at least one of the two optical information recording materials is in the amorphous state, the transmissivity in the ultraviolet ray sensitive wavelength of the resin is about 3% or more.

30. The optical information recording medium according to claim 27, wherein at least one of the two optical information recording materials is a type used only for reproduction.

31. A production process for an optical information recording medium comprising a step of affixing two pieces of optical information recording materials comprising a recording thin film layer with a change optically detectable by a laser beam irradiation and a metal reflecting layer on a transparent substrate, further comprising the steps of;

a film forming process to form a film having a transmissivity of about 3% or more in the ultraviolet ray sensitive wavelength range of a curable resin in the multi layered structure film of at least one of the two optical information recording materials;

a positioning process to position the two optical information recording materials with the surface having the multi layered film opposed to each other;

a filling process to fill the curable resin into a space provided between the opposing multi layered structure films; and an exposure process to cure the resin by the ultraviolet ray exposure.

32. The production process for an optical information recording medium according to claim 31, wherein the exposure is conducted from the both surfaces of the optical information recording materials.

33. The production process for an optical information recording medium according to claim 31, wherein at least one of the two optical information recording materials is a type used only for reproduction.

34. The production process for an optical information recording medium according to claim 31 or 32, wherein the initialization is conducted by energy line irradiation to the optical information recording medium after the exposure process.

35. The production process for an optical information recording medium according to claim 34, wherein the energy line is a laser beam.

36. The production process for an optical information recording medium according to claim 34, wherein the energy line is a flash light.

* * * * *